(12) United States Patent
Homberg et al.

(10) Patent No.: US 12,358,147 B2
(45) Date of Patent: *Jul. 15, 2025

(54) POSITIONING A ROBOT SENSOR FOR OBJECT CLASSIFICATION

(71) Applicant: Google LLC, Mountain View, CA (US)

(72) Inventors: Bianca Homberg, Mountain View, CA (US); Jeffrey Bingham, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 815 days.

This patent is subject to a terminal disclaimer.

(21) Appl. No.: 17/193,809

(22) Filed: Mar. 5, 2021

(65) Prior Publication Data
US 2021/0187735 A1   Jun. 24, 2021

Related U.S. Application Data

(63) Continuation of application No. 15/968,922, filed on May 2, 2018, now Pat. No. 10,967,507.

(51) Int. Cl.
*B25J 9/16* (2006.01)
*G06V 10/147* (2022.01)
(Continued)

(52) U.S. Cl.
CPC .......... *B25J 9/1697* (2013.01); *B25J 9/1612* (2013.01); *B25J 9/163* (2013.01); *B25J 9/1653* (2013.01);
(Continued)

(58) Field of Classification Search
CPC ........ B25J 9/1697; B25J 9/1612; B25J 9/163; B25J 9/1653; B25J 9/1664; B25J 9/162;
(Continued)

(56) References Cited

U.S. PATENT DOCUMENTS

| | | | |
|---|---|---|---|
| 5,845,048 | A | 12/1998 | Masumoto |
| 5,987,591 | A | 11/1999 | Jyumonji |

(Continued)

FOREIGN PATENT DOCUMENTS

| | | |
|---|---|---|
| CN | 102884539 | 1/2013 |
| CN | 106553195 | 4/2017 |

(Continued)

OTHER PUBLICATIONS

"APDS-9500 Imaging Gesture and Proximity Sensor," Broadccom, https://www.broadcom.com/products/optical-sensors/proximity-sensors/apds-9500, 2017, pp. 1-3.

(Continued)

*Primary Examiner* — Bhavesh V Amin
(74) *Attorney, Agent, or Firm* — McDonnell Boehnen Hulbert & Berghoff LLP

(57) ABSTRACT

In one embodiment, a method includes receiving, from a first sensor on a robot, first sensor data indicative of an environment of the robot. The method also includes identifying, based on the first sensor data, an object of an object type in the environment of the robot, where the object type is associated with a classifier that takes sensor data from a predetermined pose relative to the object as input. The method further includes causing the robot to position a second sensor on the robot at the predetermined pose relative to the object. The method additionally includes receiving, from the second sensor, second sensor data indicative of the object while the second sensor is positioned at the predetermined pose relative to the object. The method further includes determining, by inputting the second sensor data into the classifier, a property of the object.

20 Claims, 10 Drawing Sheets

(51) Int. Cl.
*G06V 20/10* (2022.01)
*G06V 20/64* (2022.01)

(52) U.S. Cl.
CPC .......... *B25J 9/1664* (2013.01); *G06V 10/147* (2022.01); *G06V 20/10* (2022.01); *B25J 9/162* (2013.01); *G06V 20/64* (2022.01); *Y10S 901/01* (2013.01); *Y10S 901/03* (2013.01); *Y10S 901/31* (2013.01); *Y10S 901/44* (2013.01); *Y10S 901/47* (2013.01)

(58) Field of Classification Search
CPC ...... G06V 10/147; G06V 20/10; G06V 20/64; Y10S 901/01; Y10S 901/03; Y10S 901/31; Y10S 901/44; Y10S 901/47; G05B 2219/37553; G05B 2219/40298; G05B 2219/40532; G05B 2219/40543; G05B 2219/40565; G05B 2219/40604; G05B 2219/45063

See application file for complete search history.

(56) References Cited

U.S. PATENT DOCUMENTS

| | | | |
|---|---|---|---|
| 7,177,459 B1 | 2/2007 | Watanabe et al. | |
| 7,272,524 B2 | 9/2007 | Brogardh | |
| 7,587,082 B1 | 9/2009 | Rudin et al. | |
| 7,706,918 B2 | 4/2010 | Sato et al. | |
| 7,818,091 B2 | 10/2010 | Kazi et al. | |
| 7,957,583 B2 | 6/2011 | Boca et al. | |
| 8,098,928 B2* | 1/2012 | Ban | G06T 1/0007 700/83 |
| 8,260,463 B2 | 9/2012 | Nakamoto et al. | |
| 8,379,014 B2 | 2/2013 | Wiedemann et al. | |
| 8,565,536 B2 | 10/2013 | Liu | |
| 8,600,161 B2 | 12/2013 | Simon et al. | |
| 8,929,608 B2 | 1/2015 | Takizawa | |
| 9,014,854 B2 | 4/2015 | Kim et al. | |
| 9,025,866 B2 | 5/2015 | Liu | |
| 9,050,719 B2* | 6/2015 | Valpola | B25J 13/085 |
| 9,205,558 B1 | 12/2015 | Zevenbergen et al. | |
| 9,266,237 B2 | 2/2016 | Nomura | |
| 9,333,649 B1 | 5/2016 | Bradski et al. | |
| 9,616,568 B1* | 4/2017 | Russell | B25J 19/02 |
| 9,987,746 B2 | 6/2018 | Bradski et al. | |
| 10,093,020 B2 | 10/2018 | Kawanami et al. | |
| 10,518,410 B2 | 12/2019 | Bradski et al. | |
| 10,639,792 B2* | 5/2020 | Vijayanarasimhan | B25J 9/1612 |
| 10,839,474 B2* | 11/2020 | Lukka | B25J 9/026 |
| 10,967,507 B2* | 4/2021 | Homberg | B25J 9/1612 |
| 11,682,097 B2* | 6/2023 | Lukka | G05B 19/425 700/219 |
| 2006/0104788 A1 | 5/2006 | Ban et al. | |
| 2006/0111811 A1 | 5/2006 | Okamoto et al. | |
| 2007/0213874 A1 | 9/2007 | Oumi et al. | |
| 2007/0239315 A1 | 10/2007 | Sato et al. | |
| 2007/0276539 A1* | 11/2007 | Habibi | B25J 9/1612 700/245 |
| 2007/0282485 A1 | 12/2007 | Nagatsuka et al. | |
| 2008/0253612 A1 | 10/2008 | Reyier et al. | |
| 2008/0301072 A1* | 12/2008 | Nagatsuka | B25J 9/1671 706/12 |
| 2009/0132088 A1* | 5/2009 | Taitler | G05B 19/42 700/264 |
| 2009/0173560 A1* | 7/2009 | Nakamoto | B25J 9/1612 700/259 |
| 2010/0004778 A1 | 1/2010 | Arimatsu et al. | |
| 2010/0286827 A1 | 11/2010 | Franzius et al. | |
| 2011/0010009 A1 | 1/2011 | Saito | |
| 2011/0123122 A1 | 5/2011 | Agrawal et al. | |
| 2011/0157178 A1 | 6/2011 | Tuzel et al. | |
| 2012/0253507 A1 | 10/2012 | Eldershaw et al. | |
| 2013/0006423 A1* | 1/2013 | Ito | B25J 9/1612 901/46 |
| 2013/0041508 A1 | 2/2013 | Hu et al. | |
| 2013/0054030 A1* | 2/2013 | Murakami | B25J 9/1697 901/31 |
| 2013/0151007 A1* | 6/2013 | Valpola | B25J 13/08 901/9 |
| 2013/0238124 A1 | 9/2013 | Suzuki et al. | |
| 2013/0343640 A1* | 12/2013 | Buehler | B25J 9/163 382/155 |
| 2013/0346348 A1 | 12/2013 | Buehler et al. | |
| 2014/0012415 A1 | 1/2014 | Benaim et al. | |
| 2014/0180479 A1* | 6/2014 | Argue | B65B 5/105 901/47 |
| 2016/0019458 A1* | 1/2016 | Kaufhold | G01S 13/9029 706/20 |
| 2016/0299508 A1 | 10/2016 | Shin et al. | |
| 2017/0028561 A1* | 2/2017 | Yamada | B25J 19/023 |
| 2017/0076438 A1 | 3/2017 | Kottenstette et al. | |
| 2017/0083796 A1* | 3/2017 | Kim | G06V 10/454 |
| 2017/0132468 A1* | 5/2017 | Mosher | G06V 10/255 |
| 2017/0252922 A1* | 9/2017 | Levine | G06N 3/045 |
| 2017/0320216 A1 | 11/2017 | Strauss | |
| 2018/0036774 A1* | 2/2018 | Lukka | B25J 9/0093 |
| 2018/0039835 A1 | 2/2018 | Rajkumar et al. | |
| 2018/0126553 A1* | 5/2018 | Corkum | B25J 9/1697 |
| 2018/0243904 A1 | 8/2018 | Bradski et al. | |
| 2019/0337152 A1* | 11/2019 | Homberg | B25J 9/1697 |
| 2020/0306980 A1* | 10/2020 | Choi | B25J 9/1697 |
| 2020/0331144 A1* | 10/2020 | Huang | B25J 9/1664 |
| 2021/0110504 A1* | 4/2021 | Lukka | B25J 9/026 |
| 2021/0187735 A1* | 6/2021 | Homberg | B25J 9/1612 |

FOREIGN PATENT DOCUMENTS

| | | |
|---|---|---|
| CN | 106660207 | 5/2017 |
| CN | 106826809 | 6/2017 |
| CN | 107428004 | 12/2017 |
| EP | 1043642 | 10/2000 |
| WO | 2019/028075 | 2/2019 |

OTHER PUBLICATIONS

"AX-12A Smart Robotic Arm," CrustCrawler Robotics, http://crust.dev.net-craft.com/products/AX12A%20Smart%20Robotic%20Arm/, 2017, pp. 1-4.

Borotschnig et al., "Appearance-based active object recognition," Image and Vision Computing, 2000, pp. 715-727, vol. 18.

"MPU-9250 Product Specification Revision 1.1," InvenSense Inc., https://www.invensense.com/wp-content/uploads/2015/02/PS-MPU-9250A-01-v1.1.pdf, 2016, pp. 1-42.

Pomares et al., "Visual Control of Robots Using Range Images," Sensors, 2010, pp. 7303-7322, vol. 10.

"Robot Components: Robot, Arms, Grippers, Camers, Head, I/O, Screen," Arms, http://sdk.rethinkrobotics.com/wiki/Arms, http://sdk.rethinkrobotics.com/wiki/Arms, 2017, pp. 1-6.

Saudabayev et al., "Sensors for Robotic Hands: A Survey of State of the Art," IEEE Access,, http://ieeexplore.ieee.org/document/7283549/, 2015, pp. 1765-1782, vol. 3.

"VL53L0X, World smallest Time-of-Flight ranging and gesture detection sensor," STMicroelectronics NV, May 2016, http://www.st.com/content/ccc/resource/technical/document/datasheet/group3/b2/1e/33/77/c6/92/47/6b/DM00279086/files/DM00279086.pdf/jcr.content/translations/en.DM00279086.pdf, 2016, pp. 1-40.

"VL6180X, Proximity and ambient light sensing (ALS) module," STMicroelectronics NV, Mar. 2016, http://www.st.com/content/ccc/resource/technical/document/datasheet/c4/11/28/86/e6/26/44/b3/DM00112632.pdf/files/DM00112632.pdf/jcr.content/translations/en.DM00112632.pdf, 2016, pp. 1-87.

* cited by examiner

POSITIONING A ROBOT SENSOR FOR OBJECT CLASSIFICATION

CROSS-REFERENCE TO RELATED DISCLOSURES

This application is a continuation of U.S. patent application Ser. No. 15/968,922 filed on May 2, 2018, which is incorporated herein by reference in its entirety.

BACKGROUND

As technology advances, various types of robotic devices are being created for performing a variety of functions that may assist users. Robotic devices may be used for applications involving material handling, transportation, welding, assembly, and dispensing, among others. Over time, the manner in which these robotic systems operate is becoming more intelligent, efficient, and intuitive. As robotic systems become increasingly prevalent in numerous aspects of modern life, it is desirable for robotic systems to be efficient. Therefore, a demand for efficient robotic systems has helped open up a field of innovation in actuators, movement, sensing techniques, as well as component design and assembly.

Robotic devices, such as robotic legs and arms, may include various components or attachments that are designed to interact with the environment. Such components may include robotic feet and hands, which may include additional components that can be used to support, stabilize, grip, and otherwise allow a robotic device to effectively carry out one or more actions.

In particular, robotic arms may include one or more "end effectors" that interact with the environment. For example, end effectors may be impactive (such as a claw), ingressive (such as a pin or needle), astrictive (such as a vacuum or suction element) or contigutive (requiring contact for adhesion, such as glue).

SUMMARY

Example embodiments involve a robot positioning a sensor to assist with object classification. For instance, the sensor may be a camera in the palm of a robotic gripping device. Initial sensor data received from a first sensor (e.g., a head-mounted camera) on a robot may be used to identify an object of an object type in the environment of the robot. For instance, a container may initially be identified. The robot may then position a second sensor at a predetermined pose relative to the object, where the predetermined pose is associated with a classifier for the object type. For instance, when the object type is a container, the second sensor may be positioned a predetermined height above the container and facing downward. Sensor data from the second sensor may then be input into a classifier which outputs one or more properties of the object. The classifier may be a machine learned model which has been trained using image data of other objects of the object type from the same predetermined pose.

In an embodiment, a method is provided that includes receiving, from a first sensor on a robot, first sensor data indicative of an environment of the robot. The method also includes identifying, based on the first sensor data, an object of an object type in the environment of the robot, where the object type is associated with a classifier that takes sensor data from a predetermined pose relative to the object as input. The method further includes causing the robot to position a second sensor on the robot at the predetermined pose relative to the object. The method additionally includes receiving, from the second sensor, second sensor data indicative of the object while the second sensor is positioned at the predetermined pose relative to the object. The method further includes determining, by inputting the second sensor data into the classifier, a property of the object.

In another embodiment, a robot is provided that includes a first sensor, a second sensor, and a control system. The control system is configured to receive, from the first sensor, first sensor data indicative of an environment of the robot. The control system is further configured to identify, based on the first sensor data, an object of an object type in the environment of the robot, where the object type is associated with a classifier that takes sensor data from a predetermined pose relative to the object as input. The control system is further configured to cause the robot to position the second sensor at the predetermined pose relative to the object. The control system is additionally configured to receive, from the second sensor, second sensor data indicative of the object while the second sensor is positioned at the predetermined pose relative to the object. The control system is also configured to determine, by inputting the second sensor data into the classifier, a property of the object.

In a further embodiment, a non-transitory computer readable medium is provided having stored therein instructions executable by one or more processors to cause the one or more processors to perform functions. The functions include receiving, from a first sensor on a robot, first sensor data indicative of an environment of the robot. The functions further include identifying, based on the first sensor data, an object of an object type in the environment of the robot, where the object type is associated with a classifier that takes sensor data from a predetermined pose relative to the object as input. The functions additionally include causing the robot to position a second sensor on the robot at the predetermined pose relative to the object. The functions also include receiving, from the second sensor, second sensor data indicative of the object while the second sensor is positioned at the predetermined pose relative to the object. The functions further include determining, by inputting the second sensor data into the classifier, a property of the object.

In another embodiment, a system is provided that includes means for receiving, from a first sensor on a robot, first sensor data indicative of an environment of the robot. The system also includes means for identifying, based on the first sensor data, an object of an object type in the environment of the robot, where the object type is associated with a classifier that takes sensor data from a predetermined pose relative to the object as input. The system further includes means for causing the robot to position a second sensor on the robot at the predetermined pose relative to the object. The system additionally includes means for receiving, from the second sensor, second sensor data indicative of the object while the second sensor is positioned at the predetermined pose relative to the object. The system further includes means for determining, by inputting the second sensor data into the classifier, a property of the object.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1:
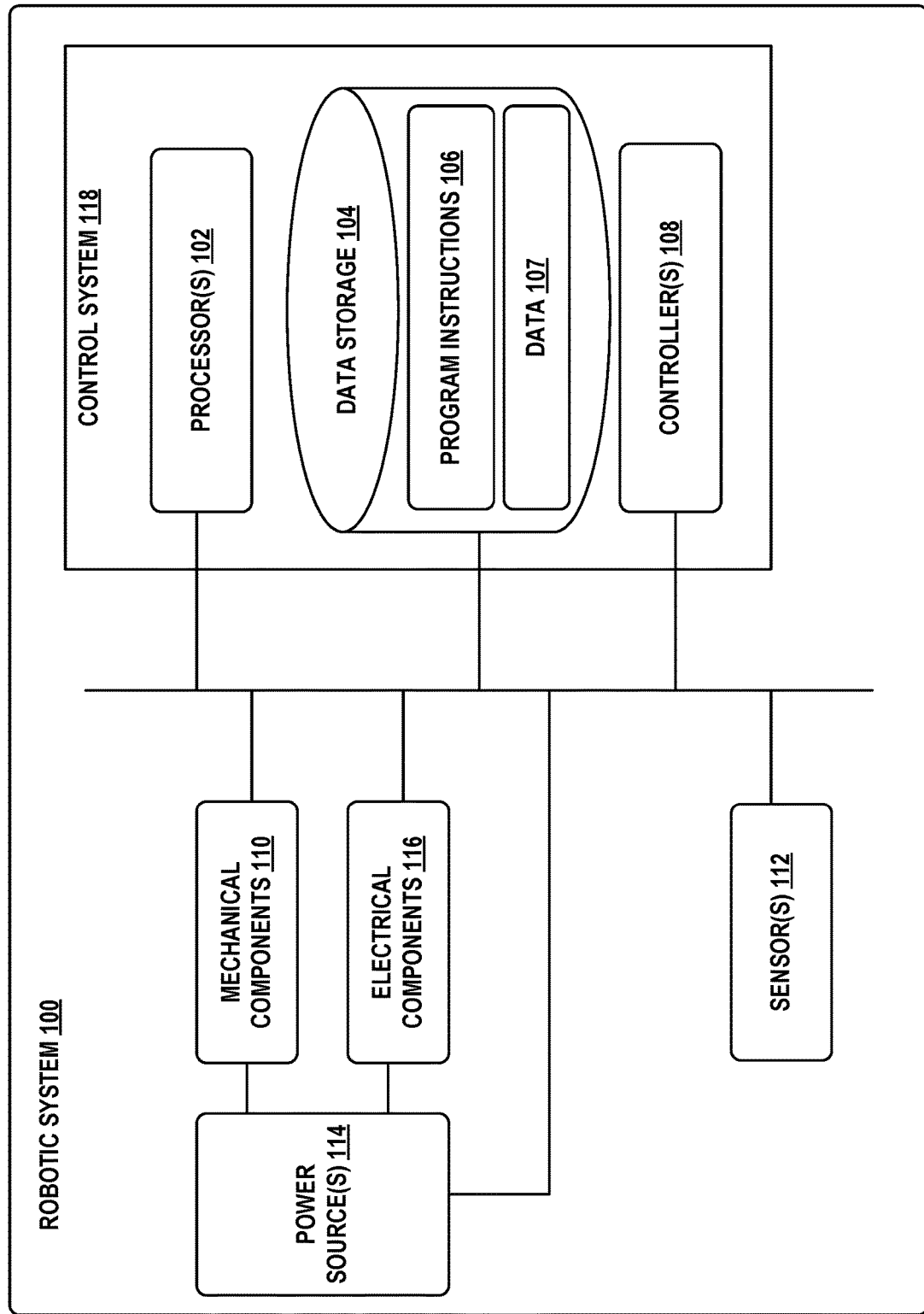
FIG. 1 illustrates a configuration of a robotic system, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless indicated as such. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Throughout this description, the articles "a" or "an" are used to introduce elements of the example embodiments. Any reference to "a" or "an" refers to "at least one," and any reference to "the" refers to "the at least one," unless otherwise specified, or unless the context clearly dictates otherwise. The intent of using the conjunction "or" within a described list of at least two terms is to indicate any of the listed terms or any combination of the listed terms.

The use of ordinal numbers such as "first," "second," "third" and so on is to distinguish respective elements rather than to denote a particular order of those elements. For purpose of this description, the terms "multiple" and "a plurality of" refer to "two or more" or "more than one."

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment. In the figures, similar symbols typically identify similar components, unless context dictates otherwise. Further, unless otherwise noted, figures are not drawn to scale and are used for illustrative purposes only. Moreover, the figures are representational only and not all components are shown. For example, additional structural or restraining components might not be shown.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. OVERVIEW

Robotic end effectors may be used in many situations to allow a robotic device to interact with an environment by pushing, pulling, grasping, holding, or otherwise interacting with one or more objects in the environment. For instance, a robotic device may include a robotic gripper having one or more digits that can be actuated to change their shape, thereby allowing the robotic gripper to interact with the environment.

In the field of robotics, and robotic grippers in particular, the control system of a robotic device may operate more effectively when provided with information regarding the environment in the area surrounding each component of the robotic device. To provide this information, different types of sensors may be placed on or included in one or more components. However, increasing the number of sensors also means increasing the complexity of the system, as well as increasing the number of possible points of failure.

Some robots may include one or more sensors remote from a gripper that may be used by a control system to help control the gripper. For example, a head-mounted camera may provide data about a gripper located at the end of a robotic arm. However, certain tasks may be difficult to perform with only data from a remote sensor. Such tasks may require positioning of a sensor close to an object in the environment in order to collect sensor data about the object to determine one or more properties of the object. Such properties may be used to determine how to control the robot. As an example, it may not be possible for a robot to see inside an opaque container in the environment using only a head-mounted camera. Accordingly, it may be advantageous for a robot to use one or more sensors on or proximate to a robotic gripper or other end effector of the robot. Although examples are described herein as relating to a sensor on or near a gripper or other end effector, it should be understood that a positionable sensor may also be located elsewhere on a robot (e.g., on an arm or other type of appendage).

In some examples, a robot may be configured to perform tasks related to manipulating objects in an environment in which people are present, such as a home, an office space, a restaurant, or a different building. Some robot tasks directed toward manipulating an object in an environment may involve picking up and moving the object, cleaning the object, refilling the object, or otherwise changing the state of the object. In such examples, challenges exist in enabling the robot to collect sufficient sensor data about relevant properties of the object to determine how to manipulate the object. Further challenges exist in enabling the robot to accurately infer a user-preferred manner in which to manipulate the object.

By provisioning a robotic gripping device with one or more non-contact sensors, the robot may be able to collect more accurate sensor data about an object such as a bowl or plate from a close-up point of view. In particular, the robot may be configured to position the gripper so that a sensor (e.g., an infrared microcamera) on the gripper is positioned at a predetermined pose relative to the object in order to collect sensor data. The predetermined pose may be based on the object type. For instance, for a container, the predetermined pose may be a downward facing pose at a predetermined height above the container. The robot may store a plurality of predetermined poses corresponding to a plurality of object types. The sensor data captured at the predetermined pose may then be evaluated by the robot in order to determine one or more properties of the object. More specifically, an image from the sensor on the gripper may be input into a classifier which takes as input the sensor data from the predetermined pose relative to the object.

In some examples, the classifier may be a machine learned model such as a neural net which has been trained based on image data captured by the robot or other similar robots. In further examples, the model may be trained by controlling the robot to position the gripper so that the sensor on the gripper is at the same predetermined pose relative to a different object of the same type. Accordingly, the predetermined pose used to train a classifier may be the same predetermined pose that will be used by the robot when applying the classifier in operation. By using a predetermined pose based on object type, the classifier may be trained more quickly and may produce more accurate results than a classifier that takes sensor data from an arbitrary pose as input data. Additionally, by using a sensor mounted on a gripper or other end effector, the sensor may be positioned into an advantageous predetermined pose to collect relevant sensor data for various object types.

In further examples, the training data may include input from a human user so that a robot can be trained to infer human intent. As an example, an object may have an object type that is identified to be a container such as a bowl. A robot may be configured to capture downward-facing image data of the bowl from a predetermined height above the bowl at multiple points during a meal (e.g., before the start of a meal, in the middle of the meal, and after the meal). The user may be provided with means (e.g., through a user interface on a mobile device) to indicate whether or not particular images correspond to a state in which the bowl should be refilled, cleared, or otherwise manipulated. The robot may also be controlled to collect a series of images at different horizontal positions to train the model. This approach helps to account for error in positioning the gripper directly over the container in operation.

Example methods are described in the context of manipulating food containers such as plates or bowls. A classifier may be particularly advantageous when applied to food containers because the mere presence of content in or on a container may not be a good indicator of a user's preferred robot behavior. However, a classifier could be trained to help a robot determine how to manipulate another type of container, such as a garbage can or a shopping bag. It should also be understood that the method could also be applied to allow a robot to collect sensor data representing many other types of objects and to make determinations about how to manipulate the objects as well.

Additionally, example methods described herein involve the robot classifying an object to determine how to manipulate an object. In further examples, close-up sensor data (e.g., from a gripper-mounted sensor) may be input into a detector to help localize the object as well or instead. For instance, after determining to manipulate an object, the robot may engage in a visual serving process to horizontally position a gripper (e.g., center the gripper over the object), and may then pick up the container with the object. Localization output from the detector may be used to help generate a trajectory to cause the gripper or other end effector to approach the object. More generally, sensor data received from an up-close sensor may be used only for classification (e.g., semantic labeling), only for detection (e.g., localization), or both. An efficiency benefit may be achieved when sensor data from an end-effector-mounted sensor is used for both. In particular, where a classifier indicates that the robot should manipulate an object, the end effector may already be well-positioned to allow for localization of the object and subsequent manipulation of the object.

II. EXAMPLE ROBOTIC SYSTEMS

FIG. 1 illustrates an example configuration of a robotic system that may be used in connection with the implementations described herein. Robotic system 100 may be configured to operate autonomously, semi-autonomously, or using directions provided by user(s). Robotic system 100 may be implemented in various forms, such as a robotic arm, industrial robot, or some other arrangement. Furthermore, robotic system 100 may also be referred to as a robot, robotic device, or mobile robot, among other designations.

As shown in FIG. 1, robotic system 100 may include processor(s) 102, data storage 104, and controller(s) 108, which together may be part of control system 118. Robotic system 100 may also include sensor(s) 112, power source(s) 114, mechanical components 110, and electrical components 116. Nonetheless, robotic system 100 is shown for illustrative purposes, and may include more or fewer components. The various components of robotic system 100 may be connected in any manner, including wired or wireless connections. Further, in some examples, components of robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). Processor(s) 102 may be configured to execute computer-readable program instructions 106, and manipulate data 107, both of which are stored in data storage 104. Processor(s) 102 may also directly or indirectly interact with other components of robotic system 100, such as sensor(s) 112, power source(s) 114, mechanical components 110, or electrical components 116.

Data storage 104 may be one or more types of hardware memory. For example, data storage 104 may include or take the form of one or more computer-readable storage media that can be read or accessed by processor(s) 102. The one or more computer-readable storage media can include volatile or non-volatile storage components, such as optical, magnetic, organic, or another type of memory or storage, which can be integrated in whole or in part with processor(s) 102. In some implementations, data storage 104 can be a single physical device. In other implementations, data storage 104 can be implemented using two or more physical devices, which may communicate with one another via wired or wireless communication. As noted previously, data storage 104 may include the computer-readable program instructions 106 and data 107. Data 107 may be any type of data, such as configuration data, sensor data, or diagnostic data, among other possibilities.

Controller 108 may include one or more electrical circuits, units of digital logic, computer chips, or microprocessors that are configured to (perhaps among other tasks), interface between any combination of mechanical components 110, sensor(s) 112, power source(s) 114, electrical components 116, control system 118, or a user of robotic system 100. In some implementations, controller 108 may be a purpose-built embedded device for performing specific operations with one or more subsystems of the robotic device 100.

Control system 118 may monitor and physically change the operating conditions of robotic system 100. In doing so, control system 118 may serve as a link between portions of robotic system 100, such as between mechanical components 110 or electrical components 116. In some instances, control system 118 may serve as an interface between robotic system 100 and another computing device. Further, control system 118 may serve as an interface between robotic system 100 and a user. In some instances, control system 118 may include various components for communicating with robotic system 100, including a joystick, buttons, or ports, etc. The example interfaces and communications noted above may be implemented via a wired or wireless connection, or both. Control system 118 may perform other operations for robotic system 100 as well.

During operation, control system 118 may communicate with other systems of robotic system 100 via wired or wireless connections, and may further be configured to communicate with one or more users of the robot. As one possible illustration, control system 118 may receive an input (e.g., from a user or from another robot) indicating an instruction to perform a particular gait in a particular direction, and at a particular speed. A gait is a pattern of movement of the limbs of an animal, robot, or other mechanical structure.

Based on this input, control system 118 may perform operations to cause the robotic device 100 to move according to the requested gait. As another illustration, a control system may receive an input indicating an instruction to move to a particular geographical location. In response, control system 118 (perhaps with the assistance of other components or systems) may determine a direction, speed, or gait based on the environment through which robotic system 100 is moving en route to the geographical location.

Operations of control system 118 may be carried out by processor(s) 102. Alternatively, these operations may be carried out by controller 108, or a combination of processor(s) 102 and controller 108. In some implementations, control system 118 may partially or wholly reside on a device other than robotic system 100, and therefore may at least in part control robotic system 100 remotely.

Mechanical components 110 represent hardware of robotic system 100 that may enable robotic system 100 to perform physical operations. As a few examples, robotic system 100 may include physical members such as leg(s), arm(s), wheel(s), hand(s), digit(s), feet, or end effectors. The physical members or other parts of robotic system 100 may further include actuators arranged to move the physical members in relation to one another. Robotic system 100 may also include one or more structured bodies for housing control system 118 or other components, and may further include other types of mechanical components. The particular mechanical components 110 used in a given robot may vary based on the design of the robot, and may also be based on the operations or tasks the robot may be configured to perform.

In some examples, mechanical components 110 may include one or more removable components. Robotic system 100 may be configured to add or remove such removable components, which may involve assistance from a user or another robot. For example, robotic system 100 may be configured with removable digits, arms, hands, feet, or legs, so that these appendages can be replaced or changed as needed or desired. In some implementations, robotic system 100 may include one or more removable or replaceable battery units or sensors. Other types of removable components may be included within some implementations.

Robotic system 100 may include sensor(s) 112 arranged to sense aspects of robotic system 100. Sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, or cameras, among other possibilities. Within some examples, robotic system 100 may be configured to receive sensor data from sensors that are physically separated from the robot (e.g., sensors that are positioned on other robots or located within the environment in which the robot is operating).

Sensor(s) 112 may provide sensor data to processor(s) 102 (perhaps by way of data 107) to allow for interaction of robotic system 100 with its environment, as well as monitoring of the operation of robotic system 100. The sensor data may be used in evaluation of various factors for activation, movement, and deactivation of mechanical components 110 and electrical components 116 by control system 118. For example, sensor(s) 112 may capture data corresponding to the terrain of the environment or location of nearby objects, which may assist with environment recognition and navigation.

In an example configuration, sensor(s) 112 may include RADAR (e.g., for long-range object detection, distance determination, or speed determination), LIDAR (e.g., for short-range object detection, distance determination, or speed determination), SONAR (e.g., for underwater object detection, distance determination, or speed determination), VICON® (e.g., for motion capture), one or more cameras (e.g., stereoscopic cameras for 3D vision), a global positioning system (GPS) transceiver, or other sensors for capturing information of the environment in which robotic system 100 is operating. Sensor(s) 112 may monitor the environment in real time, and detect obstacles, elements of the terrain, weather conditions, temperature, or other aspects of the environment. In another example, sensor(s) 112 may capture data corresponding to one or more characteristics of a target or identified object, such as a size, shape, profile, structure, or orientation of the object.

Further, robotic system 100 may include sensor(s) 112 configured to receive information indicative of the state of robotic system 100, including sensor(s) 112 that may monitor the state of the various components of robotic system 100. Sensor(s) 112 may measure activity of systems of robotic system 100 and receive information based on the operation of the various features of robotic system 100, such as the operation of extendable legs, arms, or other mechanical or electrical features of robotic system 100. The data provided by sensor(s) 112 may enable control system 118 to determine errors in operation as well as monitor overall operation of components of robotic system 100.

As an example, robotic system 100 may use force sensors to measure load on various components of robotic system 100. In some implementations, robotic system 100 may include one or more force sensors on an arm, leg, hand, foot, or digit to measure the load on the actuators that move one or more members of the arm, leg, hand, foot, or digit. As another example, robotic system 100 may use one or more position sensors to sense the position of the actuators of the robotic system. For instance, such position sensors may sense states of extension, retraction, positioning, or rotation of the actuators on arms, legs, hands, feet, digits, or end effectors.

As another example, sensor(s) 112 may include one or more velocity or acceleration sensors. For instance, sensor(s) 112 may include an inertial measurement unit (IMU). The IMU may sense velocity and acceleration in the world frame, with respect to the gravity vector. The velocity and acceleration sensed by the IMU may then be translated to that of robotic system 100 based on the location of the IMU in robotic system 100 and the kinematics of robotic system 100.

Robotic system 100 may include other types of sensors not explicitly discussed herein. Additionally or alternatively, the robotic system may use particular sensors for purposes not enumerated herein.

Robotic system 100 may also include one or more power source(s) 114 configured to supply power to various components of robotic system 100. Among other possible power systems, robotic system 100 may include a hydraulic system, electrical system, batteries, or other types of power systems. As an example illustration, robotic system 100 may include one or more batteries configured to provide charge to components of robotic system 100. Some of mechanical components 110 or electrical components 116 may each connect to a different power source, may be powered by the same power source, or be powered by multiple power sources.

Any type of power source may be used to power robotic system 100, such as electrical power or a gasoline engine. Additionally or alternatively, robotic system 100 may include a hydraulic system configured to provide power to mechanical components 110 using fluid power. Components of robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of robotic system 100. Power source(s) 114 may charge using various types of charging, such as wired connections to an outside power source, wireless charging, combustion, or other examples.

Electrical components 116 may include various mechanisms capable of processing, transferring, or providing electrical charge or electric signals. Among possible examples, electrical components 116 may include electrical wires, circuitry, or wireless communication transmitters and receivers to enable operations of robotic system 100. Electrical components 116 may interwork with mechanical components 110 to enable robotic system 100 to perform various operations. Electrical components 116 may be configured to provide power from power source(s) 114 to the various mechanical components 110, for example. Further, robotic system 100 may include electric motors. Other examples of electrical components 116 may exist as well.

Although not shown in FIG. 1, robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to reach high speeds may have a narrow, small body that does not have substantial weight. Further, the body or the other components may be developed using various types of materials, such as metals or plastics. Within other examples, a robot may have a body with a different structure or made of various types of materials.

The body or the other components may include or carry sensor(s) 112. These sensors may be positioned in various locations on the robotic device 100, such as on the body or on one or more of the appendages, among other examples.

On its body, the robotic device 100 may carry a load, such as a type of cargo that is to be transported. The load may also represent external batteries or other types of power sources (e.g., solar panels) that the robotic device 100 may utilize. Carrying the load represents one example use for which the robotic device 100 may be configured, but the robotic device 100 may be configured to perform other operations as well.

As noted above, robotic system 100 may include various types of legs, arms, wheels, end effectors, gripping devices and so on. In general, robotic system 100 may be configured with zero or more legs. An implementation of the robotic system with zero legs may include wheels, treads, or some other form of locomotion. An implementation of the robotic system with two legs may be referred to as a biped, and an implementation with four legs may be referred as a quadruped. Implementations with six or eight legs are also possible. For purposes of illustration, robotic arm implementations of robotic system 100 are described below.

Figure 2:
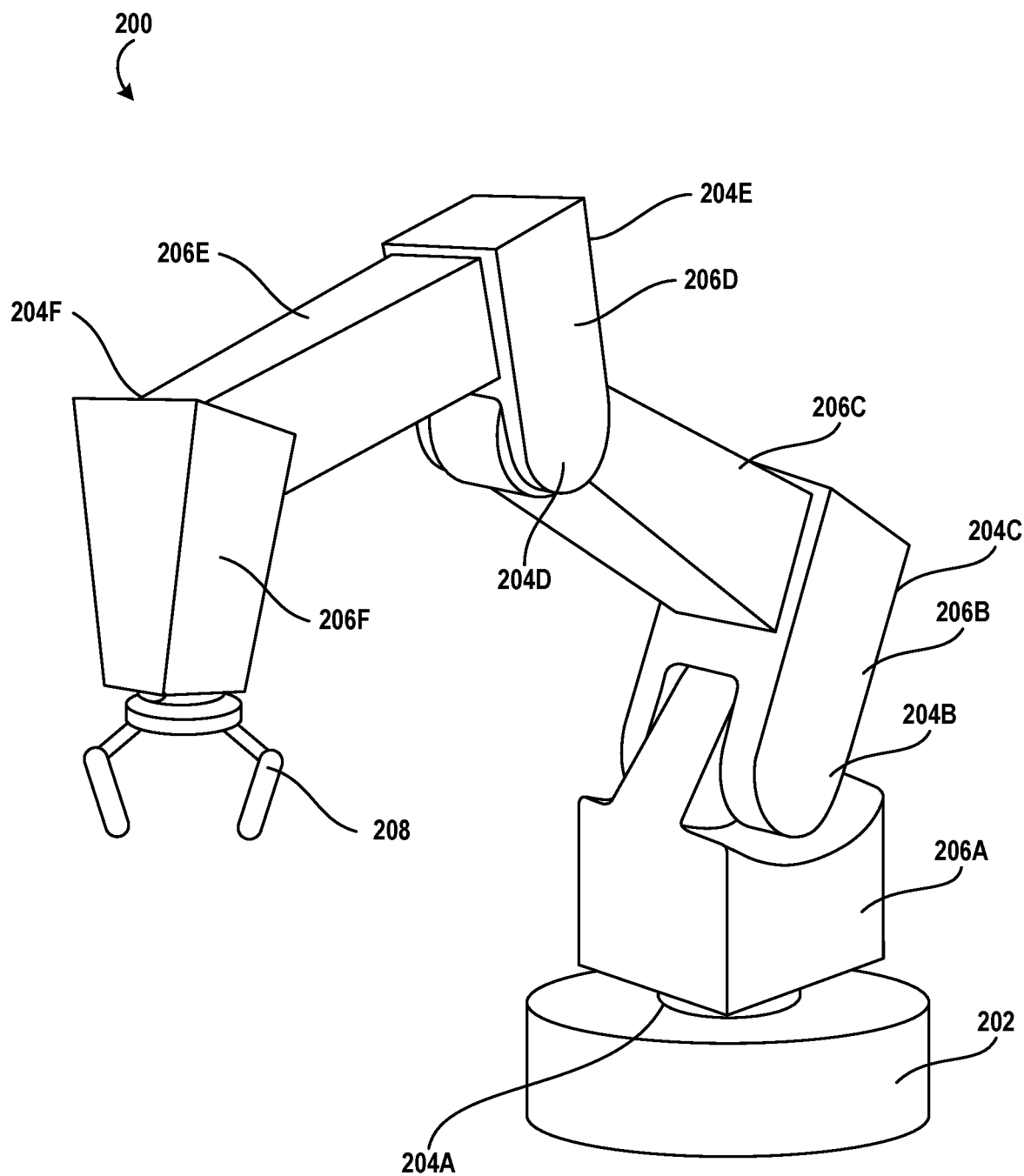
FIG. 2 illustrates a robotic arm, in accordance with example embodiments.

FIG. 2 shows an example robotic arm 200. As shown, robotic arm 200 includes a base 202, which may be a stationary base or may be a movable base. In the case of a movable base, the base 202 may be considered as one of mechanical components 110 and may include wheels (not shown), powered by one or more of actuators, which allow for mobility of the entire robotic arm 200.

Additionally, robotic arm 200 includes joints 204A-204F each coupled to one or more actuators. The actuators in joints 204A-204F may operate to cause movement of various mechanical components 110 such as appendages 206A-206F or end effector 208. For example, the actuator in joint 204F may cause movement of appendage 206F and end effector 208 (i.e., since end effector 208 is coupled to appendage 206F). Further, end effector 208 may take on various forms and may include various parts. In one example, end effector 208 may take the form of a gripper such as a digit gripper as shown here or a different type of gripper such as a suction gripper. In another example, end effector 208 may take the form of a tool such as a drill or a brush. In yet another example, the end effector may include sensors such as force sensors, location sensors, or proximity sensors. Other examples may also be possible.

In an example implementation, a robotic system 100, such as robotic arm 200, may be capable of operating in a teach mode. In particular, teach mode may be an operating mode of robotic arm 200 that allows a user to physically interact with and guide robotic arm 200 towards carrying out and recording various movements. In a teaching mode, an external force is applied (e.g., by the user) to robotic system 100 based on a teaching input that is intended to teach the robotic system regarding how to carry out a specific task. Robotic arm 200 may thus obtain data regarding how to carry out the specific task based on instructions and guidance from the user. Such data may relate to a plurality of configurations of mechanical components 110, joint position data, velocity data, acceleration data, torque data, force data, and power data, among other possibilities.

For example, during teach mode the user may grasp onto any part of robotic arm 200 and provide an external force by physically moving robotic arm 200. In particular, the user may guide robotic arm 200 towards grasping onto an object and then moving the object from a first location to a second location. As the user guides robotic arm 200 during teach mode, the system may obtain and record data related to the movement such that robotic arm 200 may be configured to independently carry out the task at a future time during independent operation (e.g., when robotic arm 200 operates independently outside of teach mode). Note, however, that external forces may also be applied by other entities in the physical workspace such as by other objects, machines, or robotic systems, among other possibilities.

Figure 3:
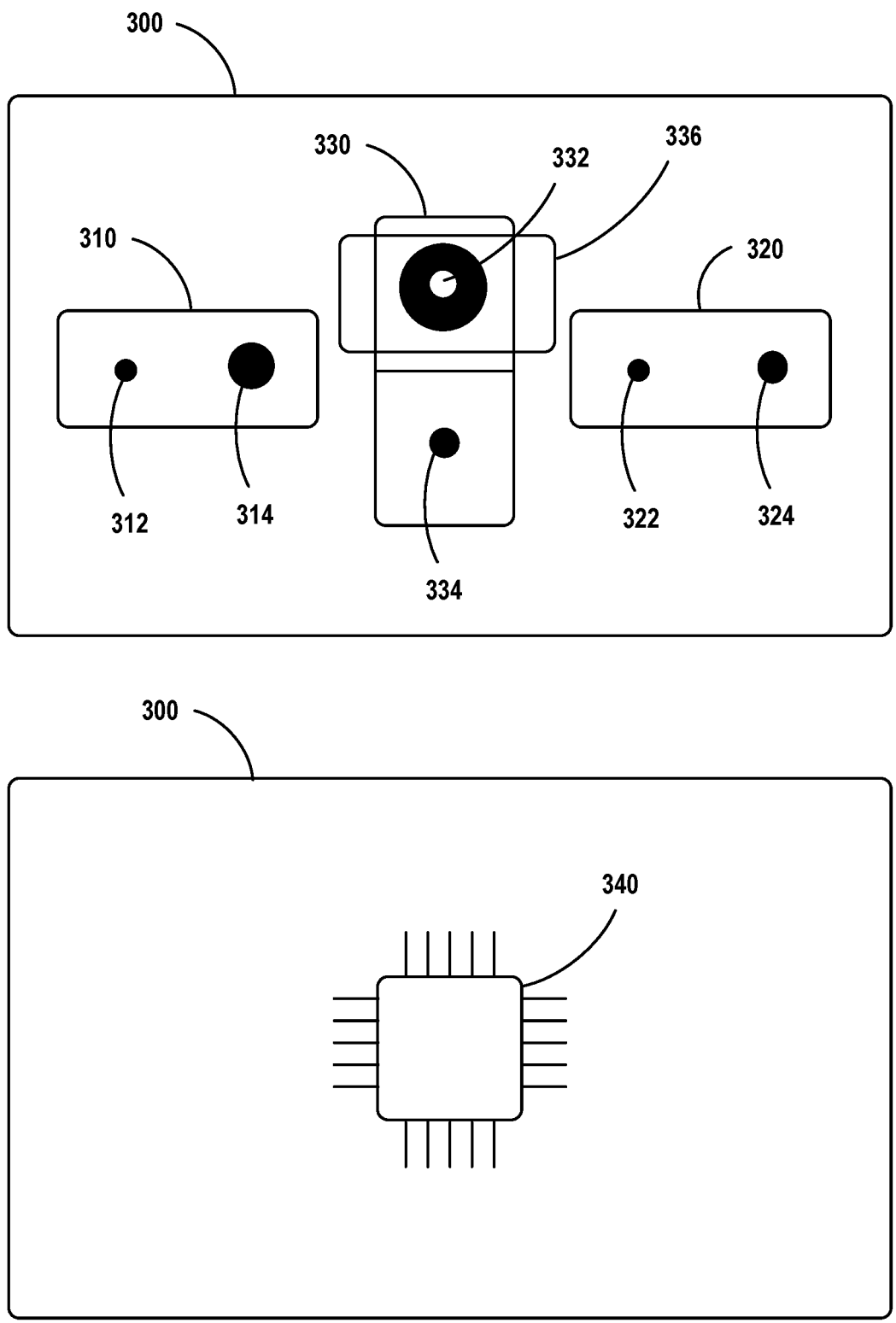
FIG. 3 illustrates a sensing device for a robotic gripper, in accordance with example embodiments.

FIG. 3 illustrates a sensing device for a robotic gripper, in accordance with example embodiments. More specifically, printed circuit board (PCB) 300 may be configured to fit into the palm of a robotic gripper. PCB 300 may include sensors including a short-range time-of-flight sensor 310, a long-range time-of-flight sensor 320, and an infrared microcamera 330 arranged on a front side of PCB 300. PCB 300 may additionally include an IMU 340 arranged on a rear side of PCB 300.

Short-range time-of-flight sensor 310 may include a narrow light source 312 and a light detector 314 to measure how long it takes laser light projected by light source 312 to bounce back after hitting an object. This time may be used to accurately determine a range or distance to a nearest object from short-range time-of-flight sensor 310 based on the known speed of light. As an example, short-range time-of-flight sensor 310 may have a range of about 1 centimeter up to 20 centimeters from the palm of the gripper. Additionally, short-range time-of-flight sensor 310 may have a relatively narrow field of view (e.g., 40 degrees) in order to detect objects within a cone of sensing range extending out from light detector 314. Based on its range, short-range time-of-flight sensor 310 may be most effective for determining information about grasped objects.

In addition to a time-of-flight distance measurement, short-range time-of-flight sensor 310 may additionally be configured to produce a reflectance measurement indicative of total activity returned to light detector 314. More specifically, a return signal rate may be generated based on the return signal count during the convergence time for the range measurement. This reflectance value or intensity value may be measured in a unit of mega-counts per second (mcps).

Long-range time-of-flight sensor 320 may also include a light source 322 and a light detector 324. However, long-range time-of-flight sensor 320 may be configured to detect objects further away from the palm of the gripper than short-range time-of-flight sensor 310. For instance, long-range time-of-flight sensor 320 may be configured to detect objects within a range of 3 centimeters up to 200 centimeters from the palm of the gripper. Long-range time-of-flight sensor 320 may also have a narrower field of view than short-range time-of-flight sensor 310. For instance, long-range time-of-flight sensor 320 may have a field of view of 25 degrees. Long-range time-of-flight sensor 320 may therefore detect a narrower cone of space in the area between gripper digits than short-range time-of-flight sensor 310. Like short-range time-of-flight sensor 310, long-range time-of-flight sensor 320 may also be configured to generate a reflectance measurement in addition to a distance measurement. Based on its range, long-range time-of-flight sensor 320 may be most effective for detecting objects to approach with the gripper.

Infrared microcamera 330 may include an infrared illumination source 332 configured to illuminate an area in front of the palm of the gripper with infrared radiation. Infrared microcamera 330 may additionally include an infrared sensitive receiver 334 for detecting at least a portion of the illuminated area. External illumination improves the performance of infrared camera 330. By relying on external illumination, camera 330 can detect objects in low-light areas or even in total darkness. Camera 330 may provide relatively high-rate, low-resolution grayscale images. A grayscale image is one in which each pixel represents only an amount or intensity of light (in this case, infrared light, or a combination of visible light and infrared light). As a specific example, camera 330 may generate 60×60 grayscale images with a range of about 60 centimeters from the palm of the gripper. In some examples, camera 330 may be configured to detect objects within a range that extends past the range of the short-range time-of-flight sensor, but does not extend as far as the range of the long-range time-of-flight sensor. Accordingly, camera 330 may be most effective for detecting objects near the tips of the digits of the gripper.

In some examples, a sensing device may additionally include an external infrared diffuser 336 to improve the performance of infrared camera 330. Infrared cameras are generally susceptible to "hot spots," overexposed sections of the image corresponding to regions where intensity from artificial infrared illuminators is greatest. More specifically, infrared camera 330 may include an integrated illuminator 332 with a narrow beam which saturates central features that reflect infrared light back into camera 330. If the infrared camera is of a type designed for gesture recognition, the camera may be configured to underexpose regions that are not overexposed, which could exacerbate the problem. Although the imager's intrinsic dynamic range may cover, e.g., a 9-bit measurement span for intensity, the returned product may be significantly degraded as content is pushed to an extreme pixel value. This effect may reduce extractable information and prevent robust feature identification.

Hot spot artifacts created by irregular reflections may cause a "headlight in fog" condition where illumination only works to blind the imager's ability to capture the scene. Irregular reflections may be produced by even regular objects when not aligned. This may undermine robot control functionality that depends on the image data, such as the ability to detect objects in hand or to visually servo based on detected edges.

To address this potential problem, an infrared diffuser 336 may be placed over illumination source 332 or the entire infrared camera 330. Diffuser 336 may be configured to diffuse (e.g., soften or spread out) concentrated infrared light from infrared illumination source 332. Diffuser 336 may have various shapes and sizes, and may be made of various materials. In some examples, diffuser 336 may be a rectangular semi-transparent plastic component external to infrared camera 330. In other examples, diffuser 336 may be integrated inside infrared camera 330 instead. In further examples, diffuser 336 may include multiple layers, possibly with each layer being made of a different material. Infrared diffuser 336 may significantly improve performance of infrared camera 330 in detecting edges and resolving other features in an area extending out from the palm of a robot gripper.

As shown in FIG. 3, infrared camera 330 may be arranged between short-range time-of-flight sensor 310 and long-range time-of-flight sensor 320 on PCB 300. By spacing out the time-of-flight sensors in this manner, additional angular information may be obtained about the region between the digits of the gripper. In further examples, the time-of-flight sensors 310, 320 and infrared camera 330 may be positioned in different arrangements on PCB 300.

In other examples, different numbers or types of non-contact sensors may be used instead of those illustrated in FIG. 3. In particular, only a single time-of-flight sensor capable of generating both accurate short-range and long-range distance data may be used instead of multiple time-of-flight sensors. Additionally, a different type of microcamera such as an RGB camera or an ultraviolet camera may be used instead of or in addition to an infrared camera in some embodiments. Other sensors could also be integrated into the system, including for example an RGB color sensor.

IMU 340 positioned on the back of PCB 300 may be relatively easy to integrate into the hardware and therefore may be nearly free in terms of offering additional information about the gripper. In particular, IMU 340 may be configured to detect vibration on contact, particularly to confirm that an object is being touched by the gripper or for slip detection. In other examples, IMU 340 might not be included on PCB 300.

Figure 4:
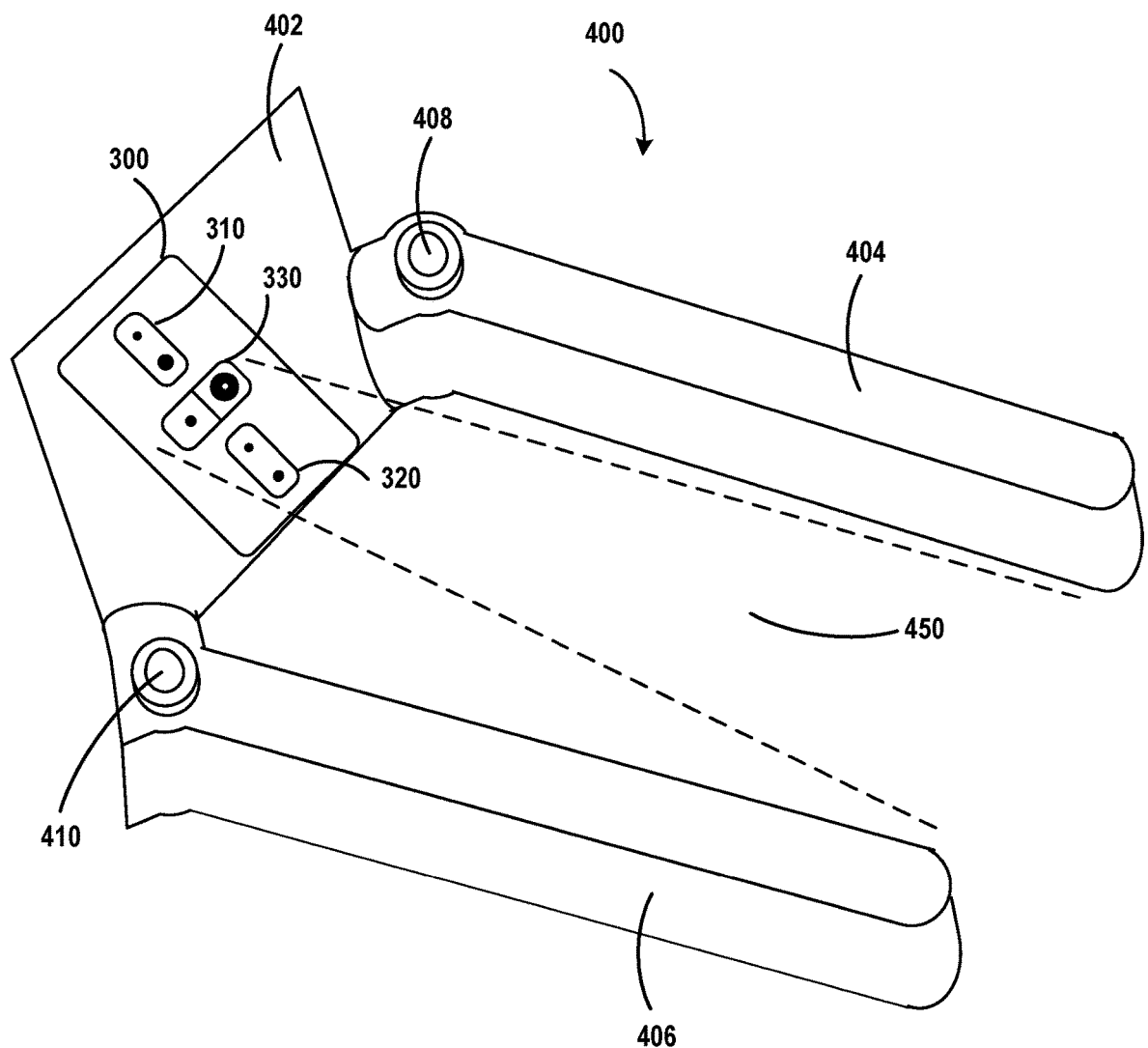
FIG. 4 illustrates a robotic gripper with a sensing device on the palm, in accordance with example embodiments.

FIG. 4 illustrates a robotic gripper with a sensing device on the palm, in accordance with example embodiments. More specifically, a robotic gripper 400 includes PCB 300 from FIG. 3 affixed to a palm 402 of robotic gripper 400. Robotic gripper 400 additionally includes opposable digits 404, 406. Digits 404 and 406 may be configured to rotate towards and away from each other using respective rotational joints 408 and 410. Such a motion may be initiated by a control system of a robot to cause digits 404 and 406 to grasp an object within a region 450 between digits 404 and 406. Further example embodiments include more than two digits (e.g., three, four, or five digits) or only a single digit (e.g., a hook gripper).

The non-contact sensors on PCB 300, including short-range time-of-flight sensor 310, long-range time-of-flight sensor 320, and infrared camera 330, may therefore be oriented on palm 402 in order to generate sensor data in a direction between digits 404 and 406. The sensor data may be indicative of objects within region 450, including objects near palm 402 and near the tips of digits 404 and 406. The sensor data may also be indicative of objects that are beyond the tips of digits 404 and 406. Each non-contact sensor on PCB 300 may generate sensor data for a different specific region in the general direction between digits 404 and 406.

As shown in FIG. 4, PCB 300 may be arranged on palm 402 so that short-range time-of-flight sensor 310, long-range time-of-flight sensor 320, and infrared camera 330 are aligned vertically. In other embodiments, PCB 300 may be arranged on palm 402 so that short-range time-of-flight sensor 310, long-range time-of-flight sensor 320, and infrared camera 330 are aligned horizontally, or in a different manner.

In some examples, PCB 300 may interface with a sensor board that services a force-torque sensor on a wrist that is coupled to palm 402 of the gripper 400. The wrist may be configured to move palm 402 or gripper 400 in one or more degrees of freedom. As an example, the force-torque sensor may be configured to measure forces and torques on the wrist in six degrees of freedom. Data from the force-torque sensor may be used to learn information about grasp quality or information about an object being grasped. In some examples, data from the force-torque sensor may be fused with data from one or more non-contact sensors on the gripper.

Although not shown in FIG. 4, in some embodiments, digits 404 and 406 may be underactuated digits. Additionally, data from one or more encoders may be used to determine torque, velocity, or position information about the digits 404 and 406. Such data may be fused with data from other sensors as well, including non-contact sensors. In further examples, additional camera data from a head-mounted camera may be used as well.

III. EXAMPLE OPERATIONS

Figure 5:
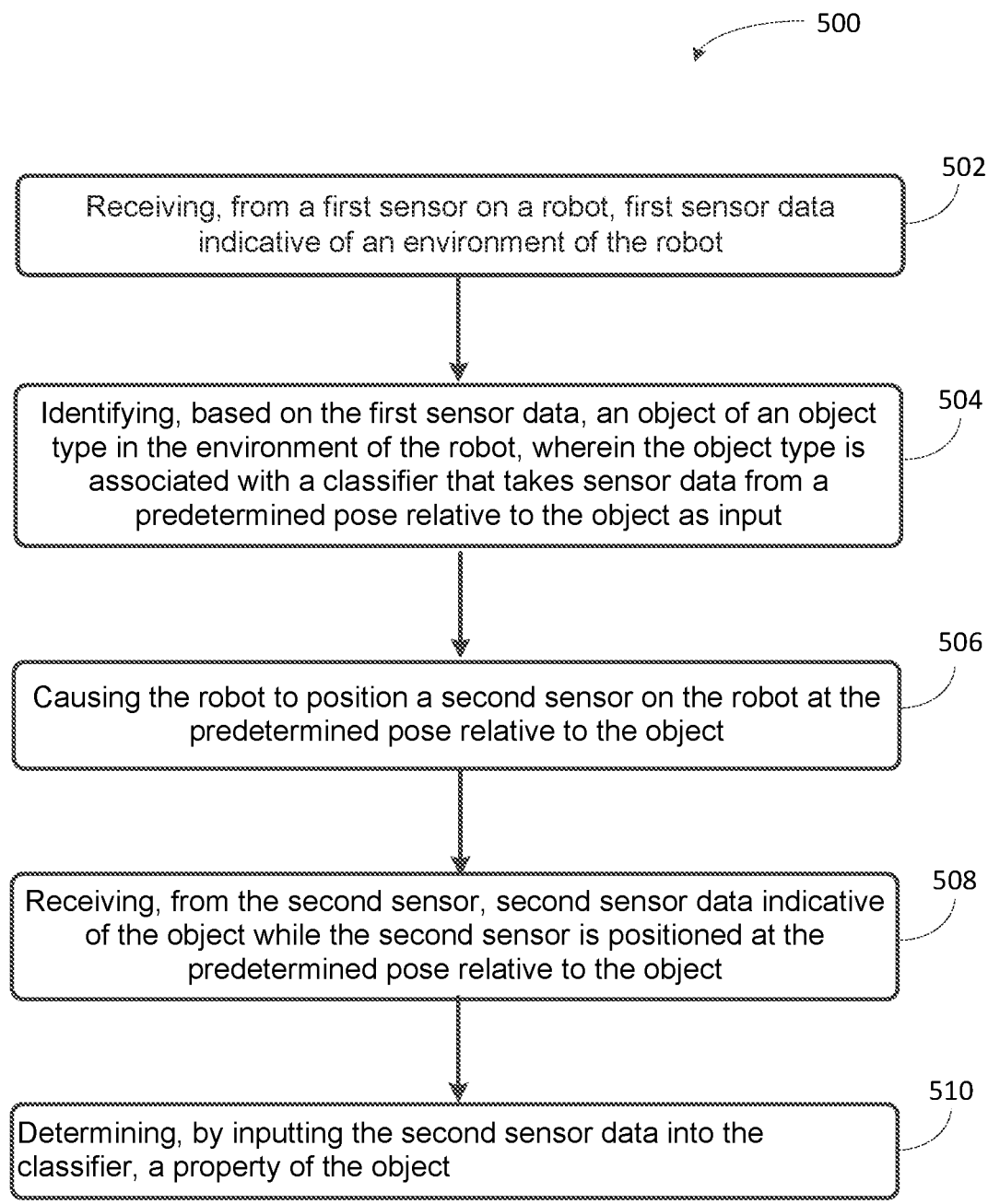
FIG. 5 illustrates a flow chart, in accordance with example embodiments.

FIG. 5 is a block diagram of a method, in accordance with example embodiments. The method 500 may be performed by a control system of a robot operating a sensorized robotic gripping device or a different type of sensorized end effector or appendage. The method 500 may involve use of any of the robotic gripping devices described and/or illustrated herein, including gripper 400 of FIG. 4, but may be applied to other robotic gripping devices having different arrangements and/or different components than those explicitly identified herein. Further, method 500 may be carried out by one or more remote or local control systems of a robotic system, a robotic arm, or a different type of robotic device.

Those skilled in the art will understand that the block diagram of FIG. 5 illustrates functionality and operation of certain implementations of the present disclosure. In this regard, each block of the block diagram may represent a module, a segment, or a portion of program code, which includes one or more instructions executable by one or more processors for implementing specific logical functions or steps in the process. The program code may be stored on any type of computer readable medium, for example, such as a storage device including a disk or hard drive.

In addition, each block may represent circuitry that is wired to perform the specific logical functions in the process. Alternative implementations are included within the scope of the example implementations of the present application in which functions may be executed out of order from that shown or discussed, including substantially concurrent or in reverse order, depending on the functionality involved, as would be understood by those reasonably skilled in the art.

At block 502, method 500 includes receiving, from a first sensor on a robot, first sensor data indicative of an environment of a robot. More specifically, the first sensor may be one of a variety of types of visual and/or depth sensors that allows the robot to collect information about the environment. In general, the first sensor may be positioned remotely from a robotic gripping device or other end effector of the robot. In some examples, the first sensor may be a head-mounted camera or other head-mounted sensor that is part of a robotic head. In further examples, the first sensor may be a Lidar sensor positioned on a robotic head or elsewhere on the robot. The first sensor data may be processed to allow the robot to identify objects in the environment in order to enable the robot to navigate, interact with objects, and perform various tasks within the environment.

Figure 6A:
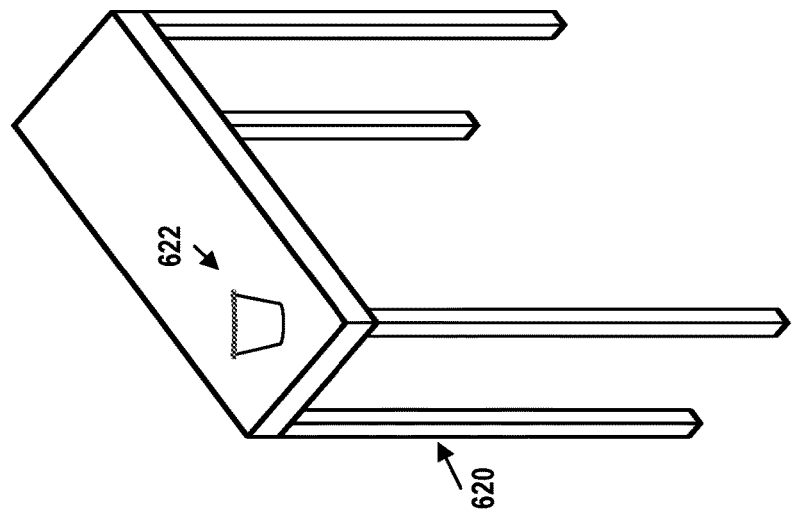
FIG. 6A illustrates a robot and a object in an environment, in accordance with example embodiments.
Figure 6A:
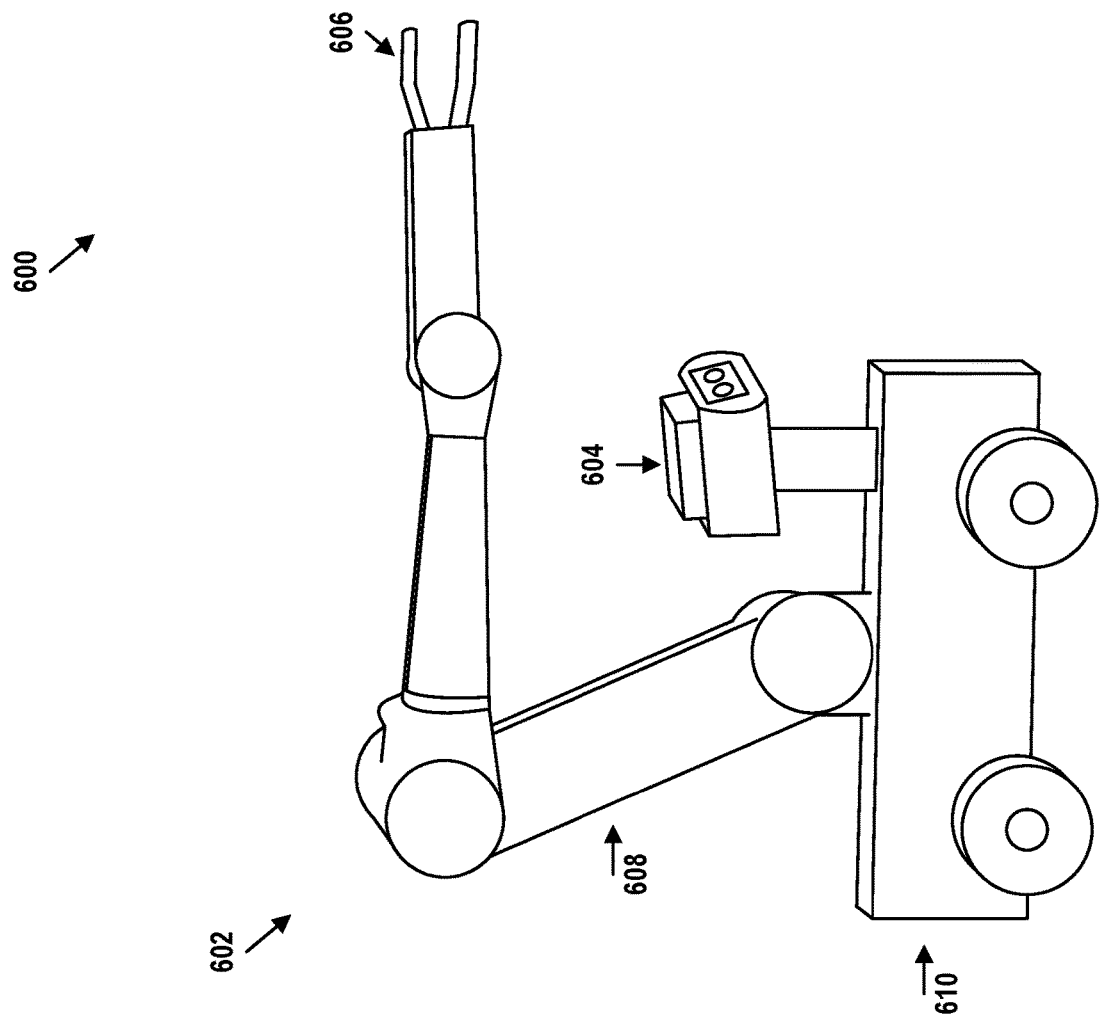

FIG. 6A illustrates a robot and an object in an environment, in accordance with example embodiments. More specifically, a robotic device 602 is shown operating within an environment 600. Robotic device 602 includes mobile base 610, robotic arm 608, gripper 606, and robotic head 604. Mobile base 610 may be configured to move robotic device 602 through the environment 600 by way of wheels, legs, or tracks, according to example embodiments. In some implementations, robotic device 602 may be connected to a base that has a fixed position in the environment 600.

Robotic arm 608 may be configured to move with multiple degrees of freedom to reposition gripper 606 relative to mobile base 610. Robotic arm 608 may, for example, represent or include aspects of robotic arm 200 of FIG. 2. Additionally, gripper 606 may represent or include aspects of end effector 208 of FIG. 2 and/or gripper 400 of FIG. 4.

In reference to gripper 400 of FIG. 4, gripper 606 may include a palm (e.g. palm 402), two or more fingers (e.g., digits 406 and 404), and a camera in the palm (e.g., camera 330). In some embodiments, gripper 606 may additionally include at least one depth sensor in the palm (e.g., short-range time-of-flight sensor 310, long-range time-of-flight sensor 320, or both). In further examples, gripper 606 may be another type of gripper capable of picking up or otherwise interacting with an object such as, for example, a suction gripper, a magnetic gripper, or an adhesive gripper which might not include any fingers or digits. In additional examples, gripper 606 may be replaced by a different type of end effector such as a tool.

Robotic head 604 may include one or more vision sensors such as a red-green-blue camera, an infrared camera, or a stereo camera, among other possibilities. In some examples, the visions sensor(s) may also include a pattern projector (e.g., an infrared projector) to assist with determination of the depth of various features within the environment. Robotic device 602 may be configured to use the vision sensor(s) in robotic head 604 to scan the environment 600 surrounding robotic device 602 to identify tasks for robotic device 602 to complete or to otherwise allow robotic device 602 to interact with the environment 600.

In some examples, robotic device 602 may operate in a shared environment alongside one or more people. In reference to FIG. 6A, environment 600 may include a table 620 with a bowl 622 on top of the table 620. Bowl 622 is an example of a food container. Other examples of food containers include, but are not limited to, plates, cups, pots, pans, dishes, or trays. In general, food containers are any objects which are designed to hold food or beverage products. In further examples, robotic device 602 may interact with other types of containers that are not food containers. More generally, a container is an object that is a receptacle for holding one or more other items.

Referring back to FIG. 5, at block 504, method 500 further includes identifying, based on the first sensor data, an object of an object type in the environment of the robot. The object type may be associated with a classifier that takes sensor data from a predetermined pose relative to the object as input. More specifically, the robot may process the first sensor data in order to identify object for which to collect additional sensor data with a second sensor. The robot may identify object types by using a first high-level classifier or soft classifier based on the first sensor data. In some examples, the robot may specifically look only for one or more types of objects for which the robot has an associated classifier (e.g., containers). An object type defines a class of objects, and may have different levels of specificity. For instance, all food containers may be one object type, or plates and bowls may each be different object types with different associated classifiers. Notably, in some examples, the first sensor data may be sufficient for the robot to identify a type of object, but not sufficient for the robot to identify the state of the object (e.g., the contents of a container) and/or other more specific properties of the object. This information may be necessary to determine how to control the robot to interact with the object.

Figure 6B:
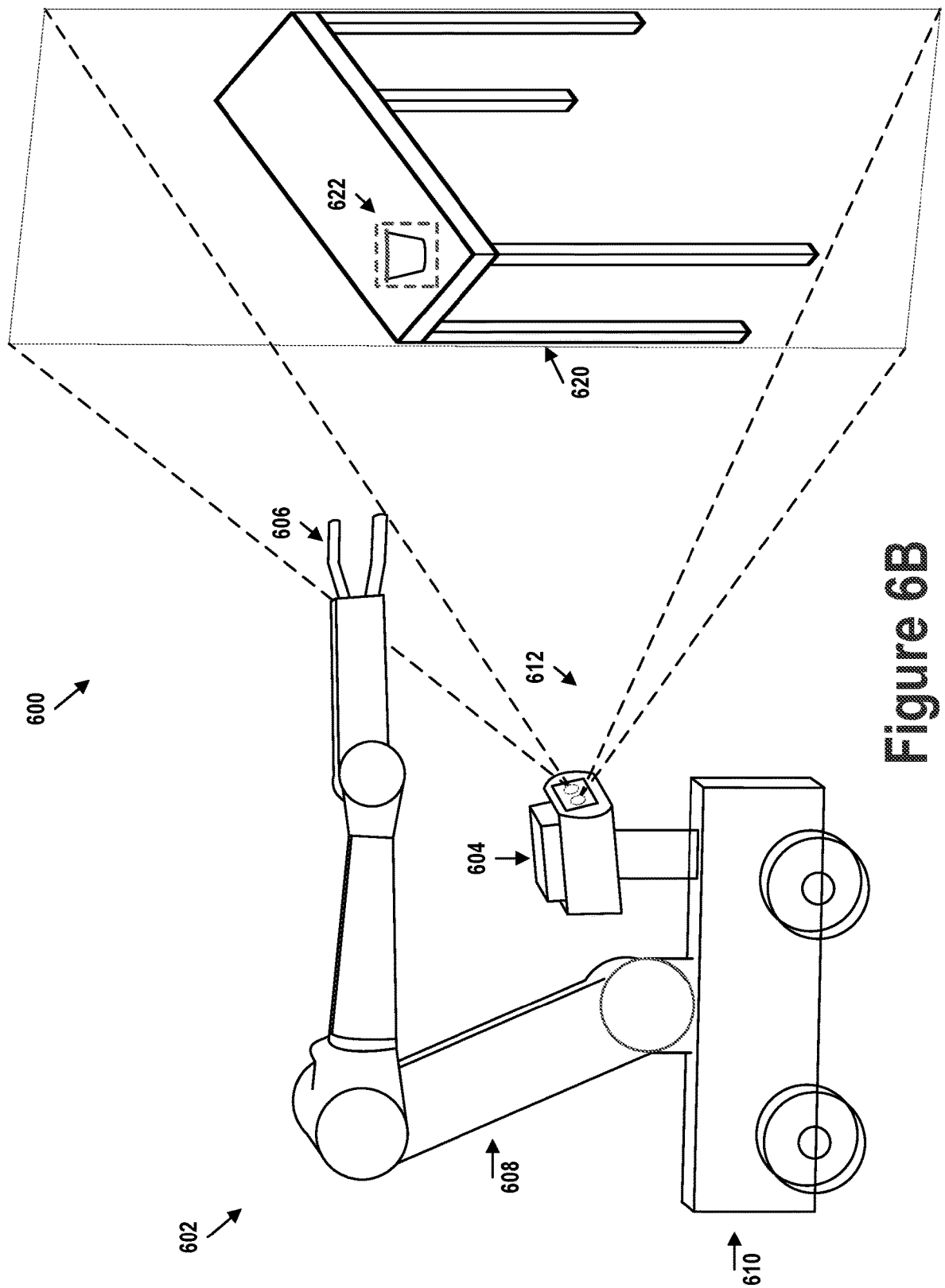
FIG. 6B illustrates detection of an object by a robot, in accordance with example embodiments.

FIG. 6B illustrates detection of an object by a robot, in accordance with example embodiments. More specifically, robotic device 602 may use the vision sensors in robotic head 604 to detect bowl 622 on top of table 620, as indicated by field of view 612. The vision sensors in robotic head 604 may provide sufficient data to identify bowl 622 as an object type, such as a container or perhaps more specifically as a bowl. However, the data may not be sufficient to identify the current contents of bowl 622. In some embodiments, the sensor data may be processed to determine a three-dimensional bounding box surrounding bowl 622, as illustrated in FIG. 6B. The bounding box may be used to determine how to position a sensor on gripper 606 relative to bowl 622 in order to collect additional data about the contents of bowl 622. The bounding box may additionally be used to determine how to control the gripper 606 to pick up the bowl 622 if a determination is made to pick up bowl 622 with gripper 606.

Referring back to FIG. 5, at block 506, method 500 further includes causing the robot to position a second sensor on the robot at the predetermined pose relative to the object. The predetermine pose is a position and orientation of the second sensor relative to the object. The predetermined pose may be the same pose that was used when training a classifier associated with the object type. Different predetermined poses may be used to collect information about objects of different corresponding object types.

For instance, if the object has been identified to be a container such as a bowl, the robot may position robotic gripping device such that a second sensor on the robotic gripping device is positioned at a predetermined height above the container and the second sensor is facing downward. More specifically, the camera or other sensor on the gripper may be positioned in order to capture image data representative of the current contents of the container. The predetermined height may be set so that the image data includes the entire container while being close enough to determine current contents or other properties of the container. In other examples, different predetermined poses may be used for different object types. For instance, if the object is identified as a mailbox, the predetermined pose may be horizontal and perpendicular to the opening of the mailbox in order to look in to the mailbox.

Figure 6C:
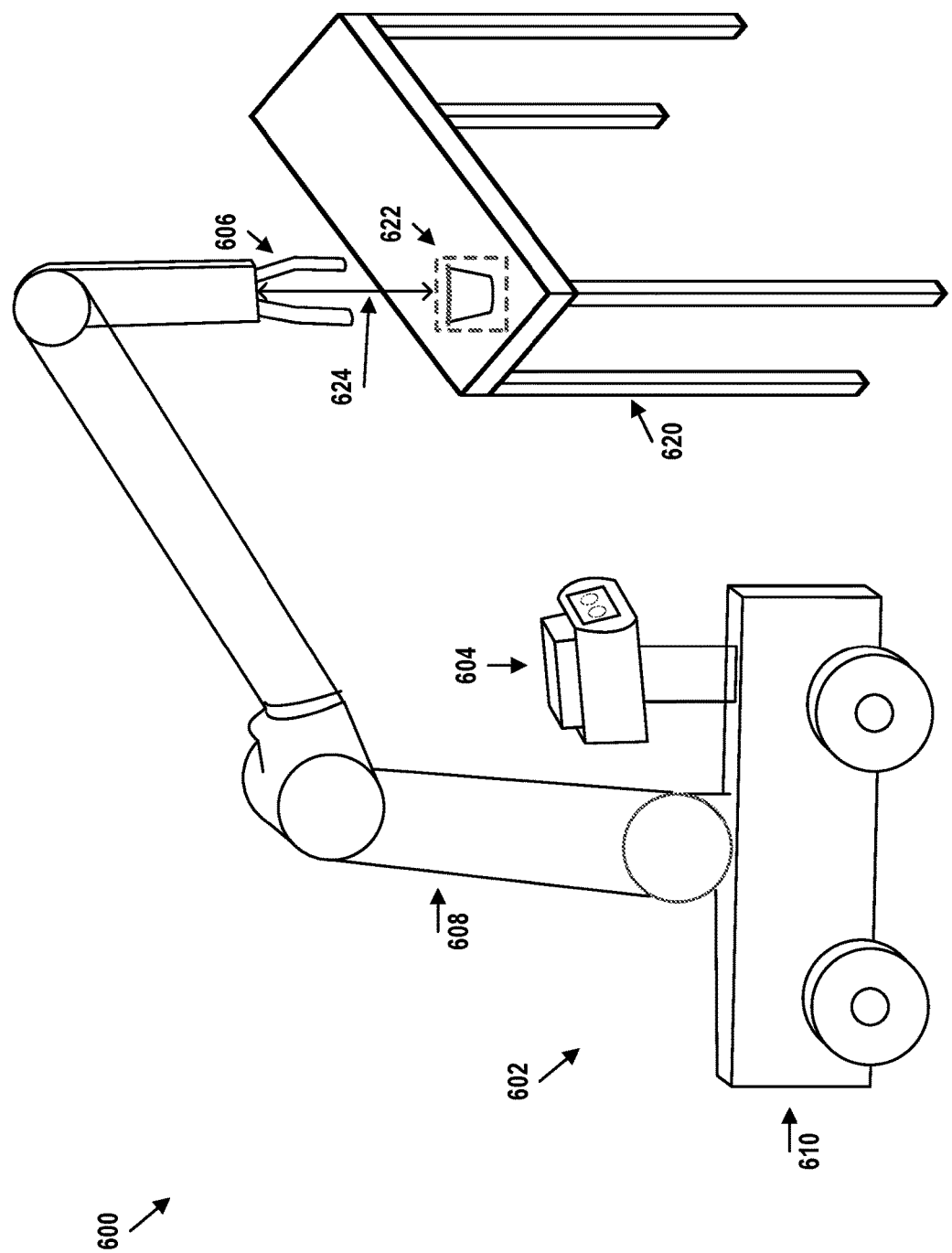
FIG. 6C illustrates positioning of a robotic gripping device over an object, in accordance with example embodiments.

FIG. 6C illustrates positioning of a robotic gripping device over an object, in accordance with example embodiments. More specifically, robot 602 may use initial sensor data from one or more sensors on robotic head 604 to identify bowl 622 in environment 600 and then to control robot arm 608 to position gripper 606 above bowl 622. More specifically, gripper 606 may be positioned so that a camera or other non-contact sensor on the gripper 606 is at a predetermined height 624 above bowl 622. For instance, the predetermined height may be a position that is one foot above the top of bowl 622. The robot 602 may control robot arm 608 to move gripper 606 to this position before capturing additional sensor data from a sensor on the gripper 606 in order to determine one or more properties about bowl 622.

In some examples, the robot 602 may process sensor data from one or more sensors on robot head 604 in order to determine a bounding box around bowl 622. In particular, the bounding box may be a virtual representation of a volume that fully surrounds the bowl 622. The bounding box may then be used by robot 602 in order to determine how to position gripper 606 above bowl 622 to collect additional sensor data. In particular, gripper 606 may be positioned so that a sensor on gripper 606 is horizontally aligned with the bounding box and above the top of the bounding box by predetermined height 624. In other examples, gripper 606 may be positioned so that some other point on gripper 606 other than the sensor is above bowl 622 by the predetermined height 624.

Referring back to FIG. 5, at block 508, method 500 further includes receiving, from the second sensor, second sensor data indicative of the object while the second sensor is positioned at the predetermined pose relative to the object. For instance, if the object is a container, second sensor data indicative of the container may be generated while the second sensor is positioned at the predetermined height above the container. More specifically, after positioning the gripper, the robot may cause a sensor on the gripper to collect sensor data describing the contents of the container. In some examples, this sensor data may be a single image from a camera on the gripper (e.g., an infrared microcamera on the palm). In further examples, the robot may capture sensor data from other types of non-contact sensors on the gripper as well or instead. In particular, sensor data may also be captured from a time-of-flight sensor or multiple time-of-flight sensors. In further examples, the robot may horizontally reposition the gripper in order to collect multiple downward-facing images from different horizontal positions and the same height. Multiple images may provide a better representation of the contents of the container, particularly where there was error in the initial positioning of the gripper above the container.

Figure 6D:
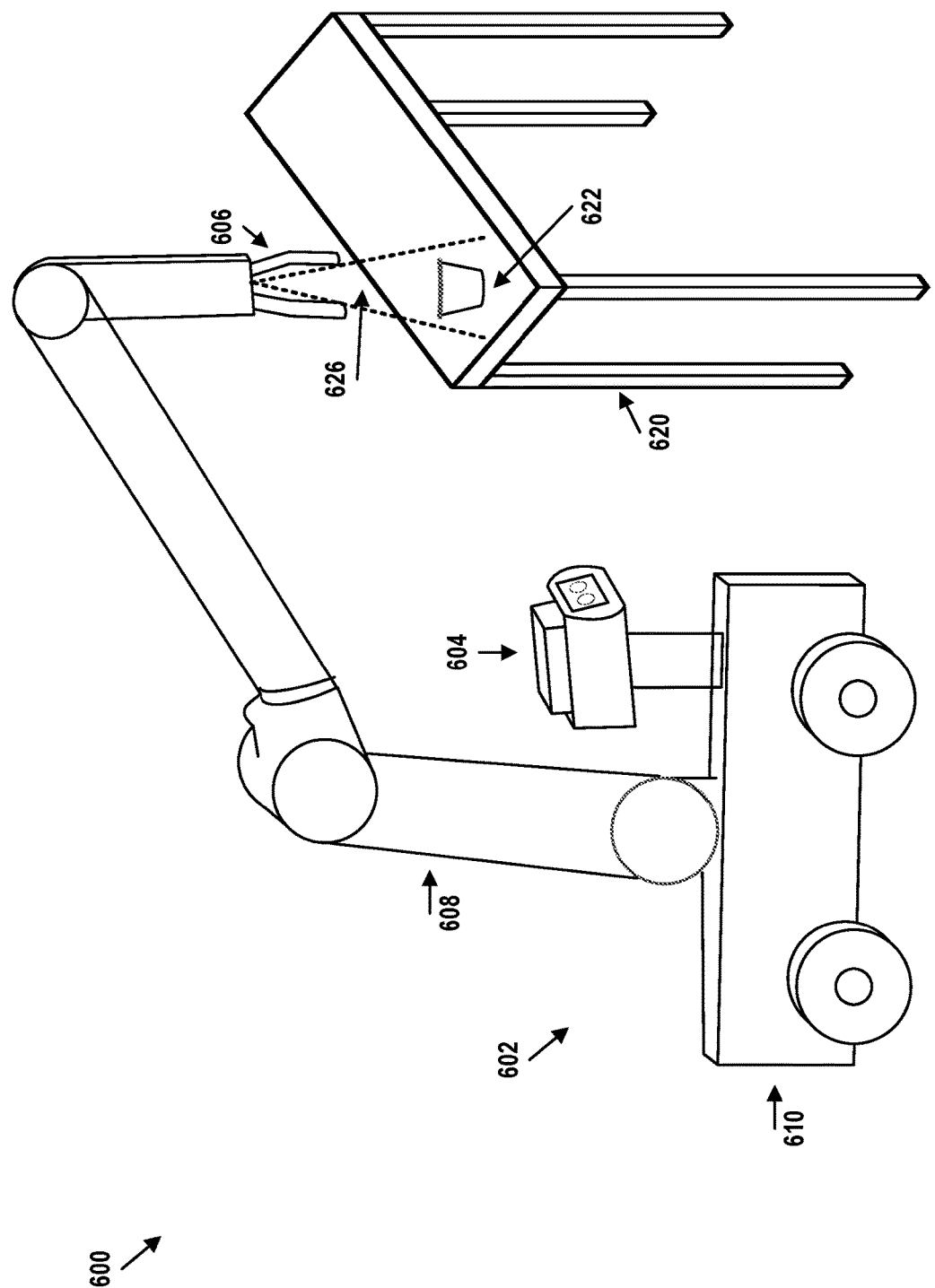
FIG. 6D illustrates sensing of an object with a sensor on a robotic gripping device, in accordance with example embodiments.

FIG. 6D illustrates sensing of an object with a sensor on a robotic gripping device, in accordance with example embodiments. More specifically, after robot 602 positions gripper 606, robot 602 may cause a downward-facing sensor on gripper 606 to collect sensor data representative of bowl 622. The sensor data may generally be representative of field-of-view 626, which includes the entirety of bowl 622. Notably, the sensor data may allow robot 602 to determine operations to perform on bowl 622 (e.g., clean, empty, fill, or remove the bowl) before making any physical contact with bowl 622.

Referring back to FIG. 5, at block 510, method 500 further includes determining, by inputting the second sensor data into the classifier, a property of the object. The classifier is an algorithm or function that maps inputted sensor data to one or more object classes. The classes may be associated with semantic labels. For instance, a bowl may be further classified as a plastic bowl or a glass bowl, as a full bowl or an empty bowl, or as a bowl intended for solid food or a bowl intended for drinking. In further examples, the object classes output by a classifier may correspond to different types of intended robot behavior. For instance, the output of the classifier may answer questions such as: can a bowl be picked up by a robot?, can a bowl be washed by a robot?, or is a bowl in a state such that it is ready to be cleared by a robot? The output of the classifier may be used to control the robot to interact with the object.

In some examples, the classifier may be a machine learned model trained based on images of object captured by the robot and/or similar robots. In some examples, the machine learned model may be a neural network. More specifically, a convolutional neural network (CNN) may be used as the classifier. A CNN typically consists of an input and an output layer, as well as multiple hidden layers. The hidden layers of a CNN typically include convolutional layers, pooling layers, fully connected layers and/or normalization layers. The input layer may include an input node for image data from a sensor (e.g., grayscale image from an infrared camera on a gripper). In further examples, input nodes may be included for other types of sensor data, such as a time-of-flight distance measurement or a time-of-flight reflectance measurement. In additional examples, multiple input nodes may be included for images captured at multiple different predetermined poses relative to an object.

In further examples, additional and/or other types of data, including non-contact-based and/or contact-based modalities may be used as input to a classifier. In some examples, data from both the first sensor and the second sensor may be fused to produce a more accurate result. In particular, sensor data from a head-mounted camera may also be used as input to a classifier (e.g., in scenarios where the head-mounted camera may be able to see some contents of a container). Other types of machine learned models may be as well. In further examples, instead of a machine learned model, a heuristics-based classifier may be used with hard-coded buckets for different features identified within captured sensor data (e.g., using object recognition algorithms on captured image data).

In further examples, the classifier may be a manipulability classifier that outputs whether or not the robot is to manipulate the object in a particular manner. If the output indicates the object is manipulatable, the robot may proceed to manipulate the object (e.g., with an end effector). If the output indicates the object is not manipulatable, the robot may leave the environment without ever touching the object.

In additional examples, a robot may be controlled to collect training data for a classifier, such as a manipulability classifier. More specifically, the robot may be controlled to capture one or more images with a sensor relative to an object with a known manipulability state. In particular, the known state may be based on user input data (e.g., entered via a user interface of a mobile device) indicating whether or not the object should be manipulated by a robot. In other examples, training data may also be generated when a robot is in operation in the field by prompting users to indicate whether or not they want the robot to manipulate an object in a particular manner. In further examples, training data may also be generated by prompting users after the robot has manipulated an object to indicate whether or not they agreed with the robot's decision. In some examples, a machine learned model may be adjusted according to particular user preferences.

As noted, a manipulability classifier may be configured to provide a binary output indicating whether or not to manipulate the object. In other examples, the manipulability classifier may instead be configured to output a manipulability score. For instance, the manipulability score may be between 0 and 1, inclusive. A score of 0 may indicate the object is not manipulatable, a score of 1 may indicate the object is manipulatable, and scores between 0 and 1 may indicate different levels of confidence in the manipulability of the object. The robot may then compare the manipulability score to a threshold score (e.g., 0.5) to determine whether or not to manipulate the object.

In further examples, the threshold score may be adjustable. In some examples, the threshold score may adjustable by a user (e.g., via a user interface of a mobile device) in order to allow the user to dictate how aggressive the robot should be in manipulating objects in an environment. In further examples, the robot may be configured to autonomously adjust the threshold score based on one or more factors. In particular, the robot may adjust the threshold score based on the environment. For instance, the robot may select a threshold score that allows for more aggressive manipulation of objects in a common area, but less aggressive manipulation of objects in a personal office.

In further examples, the classifier may be a removability classifier. A removability classifier maps inputted sensor data to an output that indicates whether a container is removable by a robot. A container is removable if it is in a state where it is ready to be picked up and removed from the environment by the robot. In some examples, the input data may be a single image captured by a gripper-mounted camera that is positioned at a predetermined height above the container. The output data may then be a binary output indicating whether or not the container is removable based on the single image. Machine learning (with user-provided training data) may be particularly appropriate in the context of removability of food containers, where the amount of content in a container by itself may not be a good indicator whether the user is done with the container. In further examples, the removability classifier may output a 0-to-1 removability score which may be compared to an adjustable threshold score as described in reference to a manipulability classifier.

Figure 6E:
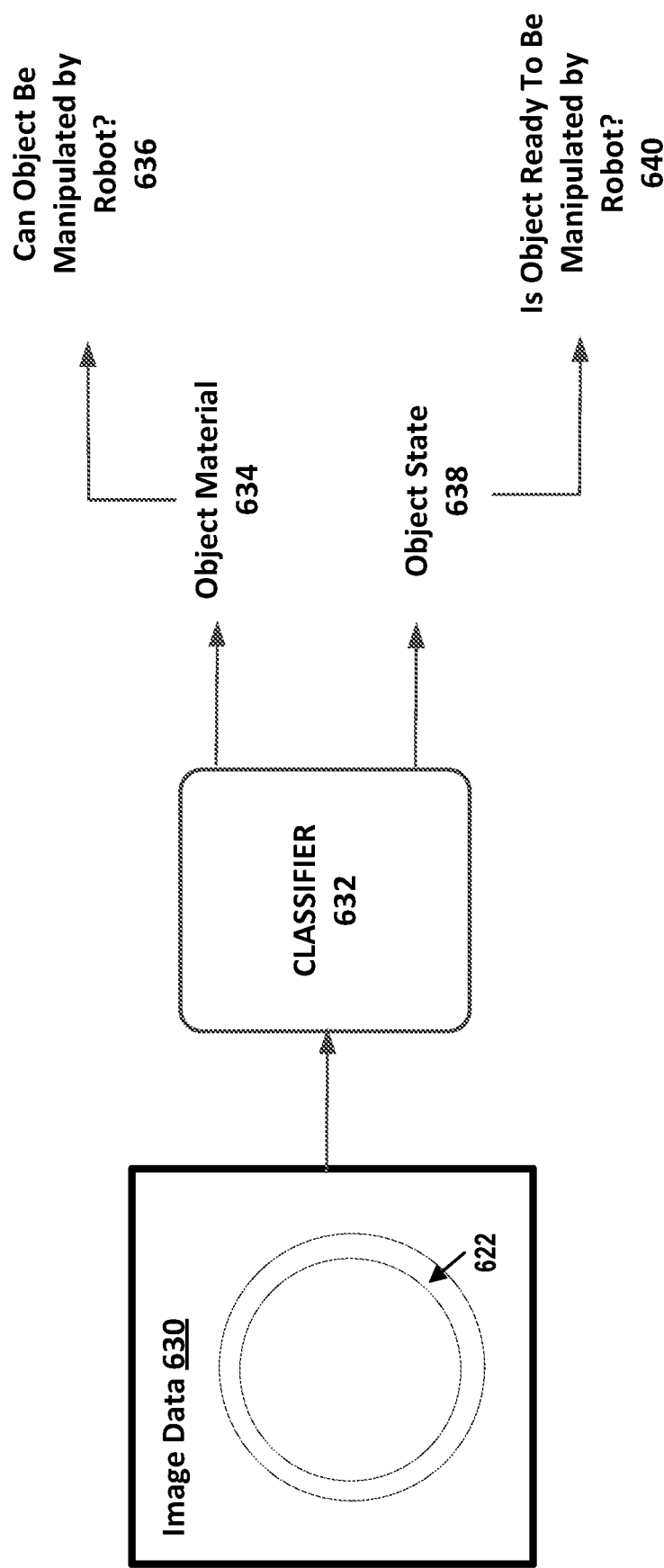
FIG. 6E illustrates application of a classifier to a captured image, in accordance with example embodiments.

FIG. 6E illustrates application of a classifier to a captured image, in accordance with example embodiments. More specifically, image data 630 may be an image captured by a camera on gripper 606 when the camera is positioned above bowl 622. Image data 630 may be representative of the contents of bowl 622. The image data 630 may be input into classifier 632 (e.g., by inputting image data 630 to an input node of a neural network). The classifier 632 may provide an output indicating one or more properties of bowl 622.

In this example, the output of classifier 632 may be an object material 634 of bowl 622. The robot 602 may use the object material 634 to make a determination 636 whether the object can be manipulated by the robot 602. In further examples, the output of classifier 632 may directly indicate whether the object can be manipulated by the robot 602. Additionally or instead, the output of classifier may be an object state 638, such as the presence of contents in bowl 622. The object state 638 may be used by the robot 602 to make a determination 640 whether the object is ready to be manipulated by the robot 602 in a particular manner. In further examples, the output of classifier 632 may directly indicate whether the object is ready to be manipulated by the robot 602 in the particular manner. Additionally, it should be understood that these classes are provided for illustration purposes. Numerous other object classes or semantic labels may be provided by a classifier to indirectly or directly influence robot behavior.

In reference to FIG. 6E, classifier 632 may be run locally in software of a local control system of robot 602. In other examples, classifier 632 may be run by a remote server, such as a cloud-based server. The cloud-based server may provide object property information and/or interaction instructions to multiple robots and may also receive feedback on the accuracy of past instructions from multiple robots. By pooling information from multiple robots, a cloud-based server may be able to fine-tune classifier 632 more quickly than a single robot.

In some examples, sensor data from an end-effector-mounted sensor may be used for detection (e.g., localization of the object) instead of or in addition to classification (e.g., semantic labeling). In particular, up-close sensor data may be used to confirm or refine an initial location estimate indicated by a more remote sensor. In some examples, a predetermined pose for the end-effector-mounted sensor may also be used to provide input data into a detector. For instance, a downward facing view from a predetermined height above a bowl may be used to ensure the location data for the bowl is accurate before picking up the bowl. The detector may also be a machine learned or heuristics-based model. The detector may be configured to take images of objects of a particular object type from a particular predetermined pose as input.

In some examples, the detector may employ region-proposal methodology, which involves separating an image into many different possible bounding boxes and detecting which boxes likely have objects within. In further examples, other methods of determining localization of an object may be used as well or instead. Such methods may use up-close sensor data (e.g., from an end-effector-mounted sensor) alone or in combination with sensor data from more remote sensors. For example, the localization methods used may include feature matching and/or motion hinting. More generally, various machine vision techniques may be employed to help localize an object.

Output from a detector may be used to control a visual serving process to center a gripper over the container. More specifically, a closed-loop control system may involve using vision information to sequentially adjust the horizontal gripper position. For instance, certain features (e.g., edges) may be extracted from infrared images that are captured at multiple points as the gripper position is adjusted. Based on how much the features move between successive images, the gripper position may be adjusted.

In some examples, a machine learned model such as a neural network may be used to control horizontal gripper positioning before picking up an object. For instance, the detector model may take one or more images and/or other sensor data from one or more sensors on the gripper as input, and may output a horizontal vector in order to center the gripper over an object. In further examples, the detector model may rely on the same feature extraction as a classifier. For instance, a front end feature extractor may feed into both a classifier model and (once an object is determined to be manipulatable) also a detector model to horizontally center the gripper over the object for pickup. This setup may allow training data to be used for both applications, although specific backend models may be fine-tuned with different sets of training data as well.

In some examples, data from the second sensor may be used to reposition or otherwise inform the first sensor. In particular, sensor data from the first sensor may be used to initially position the second sensor. Sensor data from the second sensor may then be input into a classifier and/or a detector. The output (e.g., object properties and/or object localization information) may then be used by a robot to control the first sensor. For instance, the first sensor may then be repositioned to collect additional sensor data which is used by the robot to further refine classification and/or localization information about an object. This process may be an iterative process with a sequence of adjustments of each sensor based on the latest data from the other sensor. At any point in the process, sensor data from both sensors may also be fused (e.g., simultaneously input into a single classifier or detector) in order to determine more accurate object property and/or localization information.

In some examples, data from the first sensor (e.g., a head-mounted sensor) and data from the second sensor (e.g., an end-effector-mounted sensor) may be used for a local-global calibration procedure. An object in the environment may first be located by the robot using sensor data from the first sensor. The robot may then position the second sensor by moving a robotic arm to collect up-close sensor data of the object. The up-close sensor data may be used to detect one or more features of the object. The robot may then reposition the second sensor by moving the arm slightly, and may then collect additional sensor data with the second sensor. The robot may record the offset in the one or more features based on the sensor data from the second sensor. The robot may also record the offset in motion of the arm using sensor data from the first sensor. The recorded calibration data may then be used to correct for errors between the first sensor and the arm, the second sensor and the arm, and/or the first sensor and the second sensor.

In additional examples, the first sensor and the second sensor may be used together for an object discovery procedure. For instance, in a cluttered environment, an object may be hidden from certain viewpoints by one or more other objects. The second sensor (e.g., an end-effector-mounted sensor) may be used to discover objects that are currently hidden from view by the first sensor (e.g., a head-mounted sensor) based on the current perspective of the first sensor. The robot may then use sensor data from the second sensor to determine a new perspective for the first sensor and/or a new position and orientation for the entire robot in order to allow the first sensor to better collect additional sensor data about a discovered object.

Various examples described herein involve a gripper capable of picking up and moving objects. It should be understood that the methods described herein, including method 500 of FIG. 5, may also be applied to other types of robotic end effectors. For instance, a robot may include a different type of end effector that is used for cleaning objects in place, such as a brush or a squeegee. The end effector may include one or more sensors that may collect sensor data representative of an object to feed into a classifier. In additional examples, the object may be a fixed surface in the environment. In such examples, the robot may position the end effector at a different relative pose based on the object type. For instance, a sensor on the end effector may be positioned perpendicular to a whiteboard on a wall to collect sensor data to feed into a classifier to determine whether or not to erase the whiteboard with the end effector. In another example, a robot may collect downward facing sensor data of papers on a desk to input into a classifier to determine whether or not to straighten the papers. Other examples of classifiers to determine robot behavior when interacting with particular types of objects in various environments are also contemplated.

IV. CONCLUSION

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software or hardware modules in the same physical device. However, other information transmissions may be between software modules or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:
1. A method comprising:
   receiving, from a first sensor on a robot, first sensor data indicative of an environment of the robot;
   identifying, based on the first sensor data, an object in the environment of the robot;
   selecting, based on identifying an object type of the object, a predetermined pose from a plurality of predetermined poses corresponding to a plurality of object types;
   selecting a classifier associated with the object type and the selected predetermined pose, wherein the classifier comprises a machine learned model trained based on sensor data representing objects captured from the selected predetermined pose;
   causing the robot to position a second sensor on the robot at the selected predetermined pose relative to the object, wherein the second sensor is located on an appendage of the robot;
   receiving, from the second sensor, second sensor data indicative of the object while the second sensor is positioned at the selected predetermined pose relative to the object; and
   determining, by inputting the second sensor data into the classifier, a property of the object; and controlling the robot based on the determined property of the object.

2. The method of claim 1, wherein the appendage is proximate to an end effector of the robot, and wherein controlling the robot based on the determined property of the object comprises controlling the robot to position the end effector.

3. The method of claim 1, further comprising:
determining, by inputting the second sensor data into a detector, a location of the object, wherein the detector is configured to take images of objects from the selected predetermined pose as input; and
controlling the robot to interact with the object based on the determined location of the object.

4. The method of claim 1, wherein the classifier is a manipulability classifier that is configured to output whether the object is manipulatable by the robot, and wherein the method further comprises:
when the manipulability classifier indicates that the object is manipulatable by the robot, controlling the robot to manipulate the object; and
when the manipulability classifier indicates that the object is not manipulatable by the robot, controlling the robot to leave the environment without touching the object.

5. The method of claim 4, wherein the manipulability classifier is configured to output a manipulability score, and wherein the method further comprises determining whether the object is manipulatable by the robot by comparing the manipulability score to a threshold score.

6. The method of claim 5, further comprising adjusting the threshold score based on the environment of the robot.

7. The method of claim 5, further comprising receiving the threshold score via a user interface of a mobile computing device.

8. The method of claim 1, wherein the classifier is a machine learned model trained based on images captured by the robot or by a similar robot.

9. The method of claim 1, further comprising:
causing the robot to position the second sensor at the selected predetermined pose relative to a different object;
receiving, from the second sensor, sensor data indicative of the different object while the second sensor is positioned at the selected predetermined pose relative to the different object; and
using the sensor data to train the classifier.

10. The method of claim 1, wherein the object is a container, and wherein the selected predetermined pose of the second sensor is a downward facing pose at a corresponding predetermined height above the container.

11. The method of claim 10, further comprising:
causing the robot to position the second sensor at the corresponding predetermined height above a different container at a plurality of different horizontal positions;
receiving sensor data from the second sensor when the second sensor is positioned at each of the plurality of different horizontal positions; and
using the sensor data to train the classifier.

12. The method of claim 10, wherein the appendage is proximate to a robotic gripping device, and wherein the method further causes:
determining to pick up the container with the robotic gripping device based on the property of the container;
horizontally positioning the robotic gripping device based on the second sensor data; and
controlling the robotic gripping device to pick up the container.

13. The method of claim 1, wherein the classifier takes the first sensor data as additional input.

14. The method of claim 1, further comprising determining a bounding box around the object based on the first sensor data, wherein causing the robot to position the second sensor at the selected predetermined pose relative to the object is based on the bounding box.

15. The method of claim 1, wherein the object is a food container, wherein the classifier is a removability classifier that is configured to output whether the food container is removable by the robot, and wherein the method further comprises:
when the removability classifier indicates that the food container is removable by the robot, controlling the robot to pick up and remove the food container from the environment.

16. The method in claim 1, wherein the classifier is a second classifier, wherein identifying the object is performed by inputting the first sensor data into a first classifier.

17. A robot comprising:
an appendage;
a first sensor;
a second sensor located on the appendage; and
a control system configured to:
receive, from the first sensor, first sensor data indicative of an environment of the robot;
identify, based on the first sensor data, an object in the environment of the robot;
select, based on identifying an object type of the object, a predetermined pose from a plurality of predetermined poses corresponding to a plurality of object types;
select a classifier associated with the object type and the selected predetermined pose, wherein the classifier comprises a machine learned model trained based on sensor data representing objects captured from the selected predetermined pose;
cause the robot to position the second sensor at the selected predetermined pose relative to the object;
receive, from the second sensor, second sensor data indicative of the object while the second sensor is positioned at the selected predetermined pose relative to the object; and
determine, by inputting the second sensor data into the classifier, a property of the object; and
control the robot based on the determined property of the object.

18. The robot of claim 17, wherein the appendage is proximate to a robotic gripping device, and wherein the control system is configured to control the robot based on the determined property of the object by controlling the robotic gripping device based on the property of the object.

19. The robot of claim 17, further comprising a robotic head, wherein the first sensor is coupled to the robotic head, and wherein the control system is further configured to determine the property of the object by inputting the first sensor data received from the first sensor coupled to the robotic head into the classifier.

20. A non-transitory computer readable medium having stored therein instructions executable by one or more processors to cause the one or more processors to perform functions comprising:
receiving, from a first sensor on a robot, first sensor data indicative of an environment of the robot;
identifying, based on the first sensor data, an object in the environment of the robot;

selecting, based on identifying an object type of the object, a predetermined pose from a plurality of predetermined poses corresponding to a plurality of object types;

selecting a classifier associated with the object type and the selected predetermined pose, wherein the classifier comprises a machine learned model trained based on sensor data representing objects captured from the selected predetermined pose;

causing the robot to position a second sensor on the robot at the selected predetermined pose relative to the object, wherein the second sensor is located on an appendage of the robot;

receiving, from the second sensor, second sensor data indicative of the object while the second sensor is positioned at the selected predetermined pose relative to the object; and determining, by inputting the second sensor data into the classifier, a property of the object; and controlling the robot based on the determined property of the object.

* * * * *